(12) United States Patent
Ohashi

(10) Patent No.: US 8,542,951 B2
(45) Date of Patent: Sep. 24, 2013

(54) IMAGE RETRIEVAL DEVICE AND COMPUTER PROGRAM FOR IMAGE RETRIEVAL APPLICABLE TO THE IMAGE RETRIEVAL DEVICE

(75) Inventor: Gosuke Ohashi, Shizuoka (JP)

(73) Assignee: National University Corporation Shizuoka University, Shizuoka (JP)

( * ) Notice: Subject to any disclaimer, the term of this patent is extended or adjusted under 35 U.S.C. 154(b) by 280 days.

(21) Appl. No.: 12/737,049

(22) PCT Filed: Jun. 2, 2009

(86) PCT No.: PCT/JP2009/002478
§ 371 (c)(1),
(2), (4) Date: Dec. 3, 2010

(87) PCT Pub. No.: WO2009/147840
PCT Pub. Date: Dec. 10, 2009

(65) Prior Publication Data
US 2011/0075950 A1     Mar. 31, 2011

(30) Foreign Application Priority Data

Jun. 4, 2008   (JP) ................................ 2008-147509

(51) Int. Cl.
*G06K 9/60*     (2006.01)

(52) U.S. Cl.
USPC ........... 382/305; 382/168; 382/190; 382/192; 382/194; 382/205

(58) Field of Classification Search
USPC .................. 382/305, 168, 190, 192, 194, 205
See application file for complete search history.

(56) References Cited

U.S. PATENT DOCUMENTS

| | | | |
|---|---|---|---|
| 7,379,627 B2 * | 5/2008 | Li et al. | 382/305 |
| 8,194,939 B2 * | 6/2012 | Perlmutter et al. | 382/118 |
| 2001/0046321 A1 * | 11/2001 | Murakawa | 382/190 |
| 2005/0141766 A1 * | 6/2005 | Nagahashi et al. | 382/190 |
| 2009/0034805 A1 * | 2/2009 | Perlmutter et al. | 382/118 |

FOREIGN PATENT DOCUMENTS

| | | | |
|---|---|---|---|
| JP | 2000-076269 A | | 3/2000 |
| JP | 2000076269 | * | 3/2000 |

OTHER PUBLICATIONS

Query-by-sketch—feedback. Ohashi et al., SPIE, 10.1117/12.647689, 2005, pp. 1-9.*
Query-by-sketch—feedback. Ohashi et al., 2007, pp. 537-545.*
Gosuke Ohashi et al. "Query-By-Sketch Image Retrieval System Using , Relevance Feedback", Journal of Japan Society for Fuzzy Theory and Intelligent Informatics, 2007, 10. vol. 19, No. 5, pp. 537-545.
PCT/ISA/210, App. No. PCT/JP2009/002478, Jun. 2, 2009 (1 page).

* cited by examiner

*Primary Examiner* — Jayesh A Patel
(74) *Attorney, Agent, or Firm* — Rader, Fishman & Grauer PLLC

(57) ABSTRACT

An image retrieval device that retrieves an image in response to an input image by comparing feature amounts based on an attribute of search target images and a feature amount based on an attribute of an input image. Each of the feature amounts comprises a first feature amount expressing a global relative positional relation of each pixel constituting an image with respect to pixels of the entire image, and a second feature amount expressing a local relative positional relation of each pixel constituting each of the images with respect to its adjacent pixels. Component images and at least one combination image formed therefrom are linked to a search target image and feature amounts about these respective images are compared with a feature amount about an input image and a search target image linked to a component/combination image that is similar to the input image is displayed.

14 Claims, 14 Drawing Sheets

A1　　A2

B1　　B2　　B3　　B4

C1　　C2　　C3

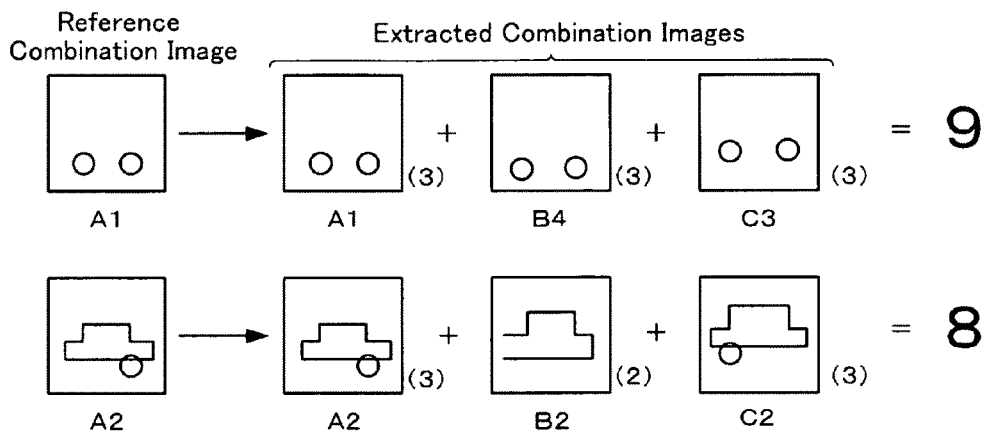
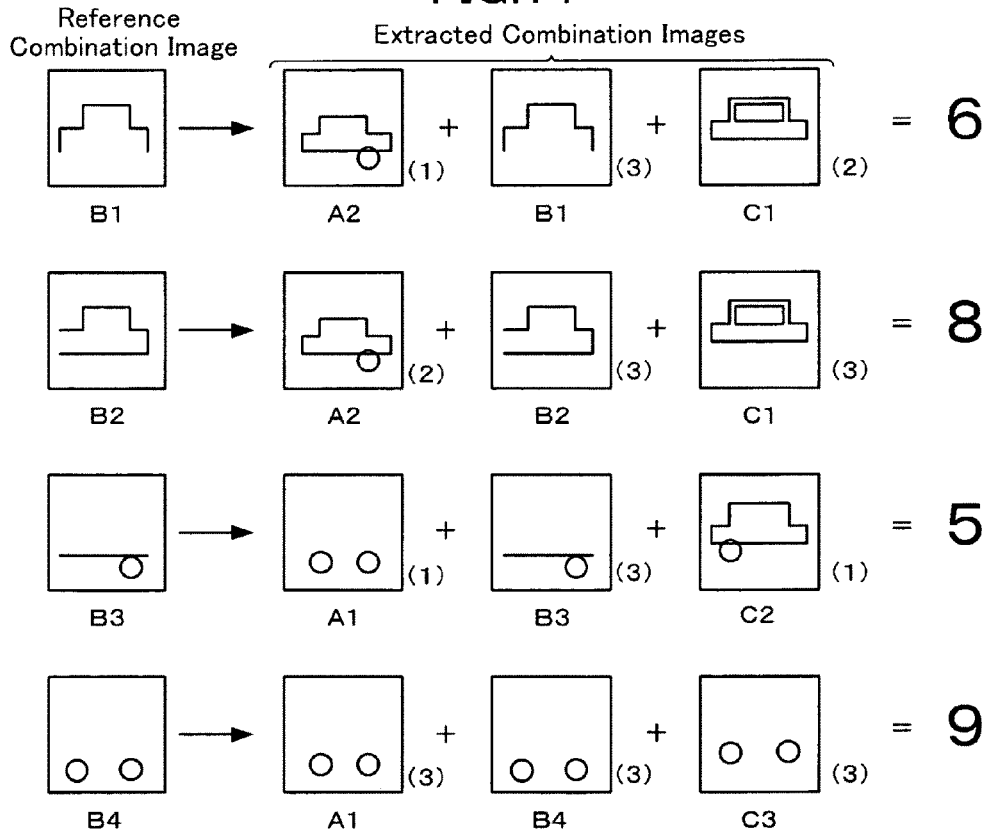

IMAGE RETRIEVAL DEVICE AND COMPUTER PROGRAM FOR IMAGE RETRIEVAL APPLICABLE TO THE IMAGE RETRIEVAL DEVICE

TECHNICAL FIELD

The present invention relates to an image retrieval device for retrieving a desired search target image based on an input image from a memory which stores a plurality of search target images, and a computer program for image retrieval applicable to such an image retrieval device.

BACKGROUND ART

Conventionally, there is an image retrieval device for retrieving a desired search target image based on an input image from a memory which stores a plurality of search target images. For example, Patent Document 1 below discloses an image retrieval device which measures image distances between an input image and search target images by using a feature amount calculated based on the input image a user draws and feature amounts calculated beforehand based on the search target images, and outputs a search target image having a short image distance as a similar image to the input image. In this case, the feature amounts use R, G, B values of the input image and the search target images.

CITATION LIST

Patent Literature

[PTL 1]
Japanese Unexamined Patent Publication No. 2000-76,269

However, in such an image retrieval device, it is often the case that a different search target image from a search target image a user wants is output as a search result in response to an input image. This is supposed to be because it is extremely difficult for a user to draw the same or a similar image to a desired search target image with a mouse or a pen tablet which constitutes an image input unit. Therefore, this type of image retrieval device has such problems that accuracy is low in retrieving the same or a similar image to an input image and image retrieval takes a long time.

In the above image retrieval device, retrieval of a search target image based on an input image is carried out by using feature amounts based only on R, G, B values of both the images as a search key. Therefore, even when a user draws an input image which is similar to a search target image the user wants, there are cases where the search target image the user wants cannot be retrieved accurately. That is to say, there is a problem that accuracy in retrieving the same or a similar image to an input image is low.

SUMMARY OF INVENTION

The present invention has been made to solve the above problems. It is an object of the present invention to provide an image retrieval device capable of retrieving a search target image a user wants accurately in a short time in response to an input image, and a computer program for image retrieval applicable to such an image retrieval device.

To attain the above object, the present invention recited in claim 1 is characterized in that in an image retrieval device, comprising image input means for inputting an image; search target image storing means for respectively storing a plurality of search target images to be searched; search target image extracting means for comparing an input image feature amount based on an attribute of an image input by the image input means and search target image feature amounts based on an attribute of the search target images, each of the feature amounts being based on an attribute of each of the images, and extracting a search target image similar to the input image from the search target images stored in the search target image storing means; and search result output means for outputting the extracted search target image as a search result, each of the feature amounts based on the attribute of each of the images comprises a first feature amount calculated about each of a plurality of pixels extracted from pixels constituting each of the images in accordance with a predetermined condition by counting the number of other pixels existing radially from a focused pixel in each of predetermined directions and statistically processing a distribution state of the number of pixels counted in each of the predetermined directions; and a second feature amount calculated about each of the plurality of extracted pixels by statistically processing presence and absence patterns of two or less pixels adjacent to the focused pixel with respect to the focused pixel into 3 to 5 kinds of feature amount groups of the presence and absence patterns.

In this case, as described in claim 2, it is preferable that in the image retrieval device, the feature amount groups in the second feature amount are constituted such that the at least two pixels include any positional relation of a horizontal relation, a vertical relation, and two diagonal relations perpendicular to each other.

In this case, as described in claim 3, it is preferable that in the image retrieval device, each of the plurality of pixels extracted in accordance with the predetermined condition in the first feature amount and the second feature amount are pixels constituting a contour of the input image or the search target images.

According to the characteristics of the present invention recited in claim 1 thus constructed, the image retrieval device compares an input image feature amount based on an attribute of an input image and search target image feature amounts based on an attribute of search target images to be searched, and thereby extracts the same or a similar image to the input image. In this case, each of the feature amounts about the input image and the search target images comprises a first feature amount expressing a global relative positional relation of each pixel constituting each of the images with respect to pixels of the entire image, and a second feature amount expressing a local relative positional relation of each pixel constituting each of the images with respect to its adjacent pixels. Accordingly, in response to an input image, a search target image can be specified based on shape information irrelevant to size, location or direction from a global viewpoint (the first feature amount) and a local viewpoint (the second feature amount). As a result, in response to the input image, the search target image a user wants can be retrieved accurately in a short time. Besides, in this case, the second feature amount is calculated by statistically processing presence and absence patterns of pixels adjacent to a focused pixel with respect to the focused pixel into 3 to 5 kinds of feature amount groups. Accordingly, the second feature amount needs very little information to be stored when compared to a case where the second feature amount is calculated by statistically processing every pattern of positional relations between those pixels and its processed result is stored, so utilization of storage capacity in a computer device can be kept extremely low.

Moreover, the present invention recited in claim 4 is characterized in that, in the image retrieval device, the image input means is for inputting an image which a user draws, the image retrieval device further comprises component image storing means for storing component images constituting a final input image input finally to the image input means in order to retrieve one of the search target images in a manner to be linked to the retrieved search target image; combination image generating means for generating at least one combination image by combining the component images stored in the component image storing means with each other for every final input image; previous image feature amount calculating means for respectively calculating previous image feature amounts which are the feature amounts about the component images and the at least one combination image; input image feature amount calculating means for calculating the input image feature amount about the input image including all input component images every time a component image is input to the image input means; and similar previous image extracting means for comparing the previous image feature amounts and the input image feature amount and extracting an image similar to the input image as a similar previous image from the component images and the combination image, and the search result output means outputs the search target image linked to the similar previous image as a search result in addition to the search target image extracted by the search target image extracting means.

According to the characteristics of the present invention recited in claim 4, the image retrieval device stores component images of an image which some user input in the past in order to retrieve a search target image in a manner to be linked to the retrieved search target image beforehand. Then, every time a single line is drawn by a user and its image is input, the image retrieval device compares the entire drawn image with the component images and the at least one combination image constituted by the component images and extracts a component image or a combination image similar to the entire input image. Then, the image retrieval device outputs a search target image linked to the extracted component image or combination image. That is to say, an input image a user draws in order to retrieve a search target image has a very strong possibility of being more similar to a previous image which the same or a different user input in the past in order to retrieve the same search target image than to the very search target image to be retrieved. Therefore, it makes extraction of the search target image the user wants easier to compare the input image the user has drawn with previous images than to compare that input image with the search target images. Besides, in this case, when compared with comparing an image which a user has finally input with the final previous images the user or other users input in the past, the desired search target image can be retrieved more quickly by comparing an input image which is updated with a progress of being drawn by the user with component images constituting previous images or at least one combination image obtained by combining the component images. As a result, in response to an input image which the user has drawn, the search target image which the user wants can be retrieved accurately in a short time.

The present invention recited in claim 5 is characterized in that the image retrieval device further comprises search target image designating means for allowing the user to designate one of the search target images among the search results and, when the one of the search target images is designated by the search target image designating means, the component image storing means stores component images constituting the final input image in a manner to be linked to the designated search target image.

According to the characteristics of the present invention recited in claim 5 thus constructed, upon a user's designating a search target image among search results, component images constituting an input image drawn in order to extract the designated search target image are stored in a manner to be linked to the designated search target image. Therefore, every time a search target image retrieved based on an input image is designated as an image a user wants, the number of component images and combination images linked to the search target image increases. Accordingly, the designated search target image becomes extracted in response to input images in a wider range of variation, and as a result, accuracy in retrieving the search target image is further enhanced.

The present invention recited in claim 6 is characterized in that, in the image retrieval device, the similar previous image extracting means compares the input image feature amount and the previous image feature amounts about the component images in the same number as the number of component images constituting the image input to the image input means in order to retrieve the same search target image or the at least one combination image constituted by these component images and extracts the similar previous image.

According to the characteristics of the present invention recited in claim 6 thus constructed, when an image input to the image input means is compared with the component images or the at least one combination images, the input image is compared with component images in the same number as the number of component images constituting the input image or at least one combination images constituted by these component images. Since a process of comparing the input image with component images or at least one combination image having the same construction as that of the input image is executed, a more efficient and accurate search process can be executed when compared with a case where a process of comparing the input image with all component images and combination images is executed.

The present invention recited in claim 7 is characterized in that, in the image retrieval device, the component image storing means stores an order number of each of the component images being input to the image input means as a drawing order number together with each of the component images; the image retrieval device further comprises high frequency combination image storing means for storing, as a high frequency combination image, a combination image having a higher frequency of linkage to the same search target image than other combination images among the combination images linked to the same search target image and constituted by two or more of the component images having consecutive drawing order numbers; and drawing order combination image generating means for generating a drawing order combination image constituted by component images each having a drawing order number in a range of the number of component images constituting the high frequency combination image back from a drawing order number of an image of a latest line input to the image input means every time a component image is input to the image input means; the input image feature amount calculating means calculates a drawing order combination image feature amount which is the feature amount about the drawing order combination image; the similar previous image extracting means extracts the similar previous image by executing a process of comparing the previous image feature amount about the high frequency combination image and the drawing order combination image feature amount in priority to a process of comparing other previous image feature amounts and the input image feature amount, and when the high frequency combination image is extracted as the similar previous image by the previous image extracting means, the search result output means outputs the search target image linked to the extracted high frequency combination image.

According to the characteristics of the present invention recited in claim 7 thus constructed, the image retrieval device stores, as a high frequency combination image, a combination image having a higher frequency of linkage to the same search target image than other combination images among the combination images linked to the same search target image and constituted by two or more of the component images having consecutive drawing order numbers beforehand. Then, in comparing an image input to the image input means and the combination images, the image retrieval device executes a process of comparing an input image constituted by component images each having a drawing order number in a range of the number of component images constituting the high frequency combination image back from a drawing order number of an image of a latest line input to the image input means, and the high frequency combination image in priority to a process of comparing other combination images and the input image. This is because the present inventor has found through experiments that when users draw input images in order to retrieve the same search target image, there are two or more component images which tend to have consecutive drawing order numbers. Therefore, a more efficient and accurate search process can be executed by comparing an input image with a combination image constituted by two or more component images which empirically tend to have consecutive drawing order numbers as a high frequency combination image in priority than comparing an input image with all component images and combination images without considering priority of comparison with the input image.

The present invention recited in claim 8 is characterized in that the image retrieval device further comprises high frequency combination image extracting means for extracting, as the high frequency combination image, the combination image having a higher frequency of linkage to the same search target image than other combination images among the combination images linked to the same search target image and constituted by two or more of the component images having consecutive drawing order numbers.

According to the characteristics of the present invention recited in claim 8 thus constructed, the high frequency combination image, which has a higher frequency of linkage to the same search target image is automatically extracted from the combination images linked to the same search target image. Accordingly, a high frequency combination image can be stored in the high frequency image storing means efficiently and securely, and a process of retrieving a search target image can be executed accurately in a short time.

The present invention recited in claim 9 is characterized in that, in the image retrieval device, the high frequency combination image extracting means extracts a plurality of high frequency combination images for the same search target image and calculates priority in accordance with frequency of the extracted high frequency combination images; and the similar previous image extracting means extracts the similar previous images in a higher order of the priority by using the previous image feature amounts about the high frequency combination images.

According to the characteristics of the present invention recited in claim 9 thus constructed, priorities are respectively assigned to a plurality of high frequency combination images extracted for the same search target image, and the high frequency combination images are compared with an input image in a higher order of the priority. Accordingly, when compared with only a single high frequency combination image is extracted and compared with an input image, high frequency combination images of wider variations can be compared with the input image, and a search target image a user wants can be retrieved accurately in a short time.

The present invention recited in claim 10 is characterized in that, in the image retrieval device, the search target image storing means stores the search target image feature amounts; and when the similar previous image is not extracted by the similar previous image extracting means, the search target image extracting means compares the search target image feature amounts and the input image feature amount and extracts a search target image similar to an input image.

According to the present invention recited in claim 10 thus constructed, when an input image is compared with the component images and the combination images but no similar previous image is extracted by the comparing process, the input image is compared with the search target images in order to extract a search target image. That is to say, an input image is compared with component images and at least one combination image having a similar construction to the input image in priority. Accordingly, a more efficient and accurate search process can be executed when compared with a case where the input image is compared with search target images first.

The present invention recited in claim 11 is characterized in that, in the image retrieval device, each of the component images is image information input in the form of one drawn line to the image input means. Since a process of searching through the search target images is executed every time a user draws a line, operation of this image retrieval device is easy for a user to understand and use.

The present invention recited in claim 12 is characterized in that the image retrieval device further comprises parts image storing means for storing parts images to be used for drawing an image to be input to the image input means, and the component images are the parts images input by way of the image input means. Accordingly, an input image can be drawn quickly and accurately by preparing images which are difficult to be drawn by such an input means as a mouse and a pen tablet or images which are used frequently in the parts image storing means beforehand, and as a result accuracy in retrieving a search target image can be improved. It should be noted that when the invention according to claim 12 is applied to the invention according to claim 7, the drawing order number according to claim 4 corresponds to an order number of a parts image being input.

Moreover, the present invention can be carried out not only as an invention of an image retrieval device but also as an invention of a computer program applicable to such an image retrieval device.

BRIEF DESCRIPTION OF DRAWINGS

FIG. 13 is an explanatory view for explaining the process of extracting a high frequency combination image.

FIG. 14 is an explanatory view for explaining the process of extracting a high frequency combination image.

| Reference Signs List | |
|---|---|
| W1, W2, W3 | windows |
| i | a focused pixel |
| r | an adjacent pixel |
| 100 | an image retrieval device |
| 101 | a CPU |
| 102 | a main memory |
| 103 | an auxiliary storage unit |
| 104 | a computer main body |
| 105 | an input unit |
| 105a | a keyboard |
| 105b | a mouse |
| 106 | a display unit |

BEST MODES FOR CARRYING OUT THE INVENTION

First Preferred Embodiment

Figure 1:
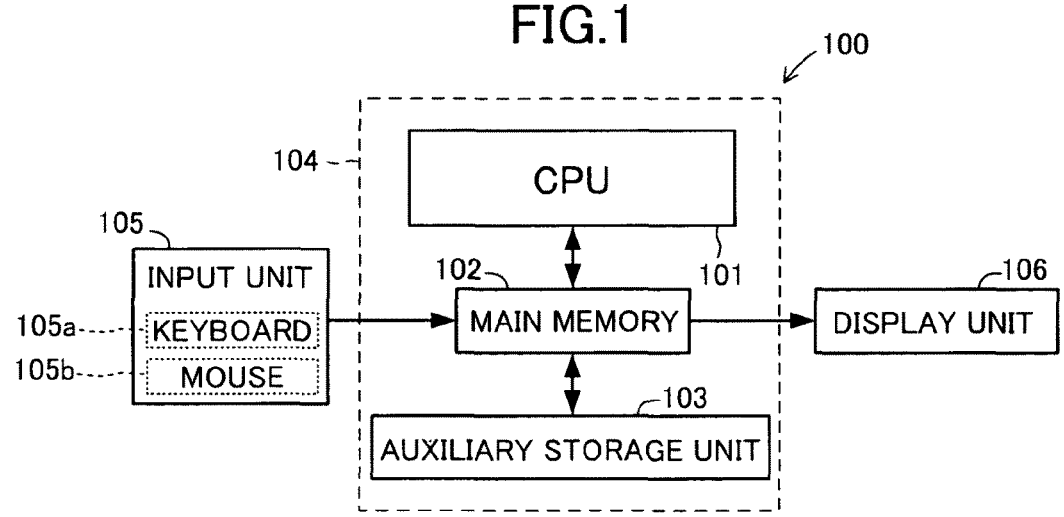
FIG. 1 is a block diagram illustrating a schematic construction of an image retrieval device according to a first preferred embodiment and a second preferred embodiment of the present invention.

Hereinafter, an image retrieval device according to a first preferred embodiment of the present invention will be described with reference to the drawings. FIG. 1 is a block diagram illustrating construction of an image retrieval device 100 according to the present invention. It should be noted that the drawings referred to in the description of the present invention schematically illustrate the device with an emphasis only on a part of constituents in order to facilitate understanding of the present invention. Therefore, the dimension and ratio of respective constituents in the drawings are sometimes different from those of real constituents.

(Construction of the Image Retrieval Device 100)

The image retrieval device 100 is a personal computer (PC) comprising a computer main body 104 having a central processing unit (CPU) 101, a main memory 102 and an auxiliary storage unit 103, and an input unit 105 and a display unit 106 connected to the computer main body 104. The CPU 101 includes an arithmetic unit and a control unit not shown, and executes various kinds of arithmetic processing according to programs stored in the main memory 102, and controls operation of the main memory 102, the auxiliary storage unit 103, the input unit 105 and the display unit 106, respectively. The main memory 102 comprises a ROM, a RAM, or the like not shown, and stores programs and data for operating the CPU 101 and various kinds of information which is necessary for the CPU 101 to execute instructions.

The auxiliary storage unit 103 comprises a hard disc device and stores an operating system (OS) and various kinds of application programs such as a first image retrieval program for realizing the present invention, respectively. In executing the first image retrieval program, this auxiliary storage unit 103 is used for temporarily or permanently storing various kinds of information and various kinds of images (image data) which are necessary for the execution of the program. Specifically, this auxiliary storage unit 103 stores a plurality of search target images and previous sketch images, respectively. The search target images mentioned here are images to be searched upon the execution of the first image retrieval program.

Figure 2:
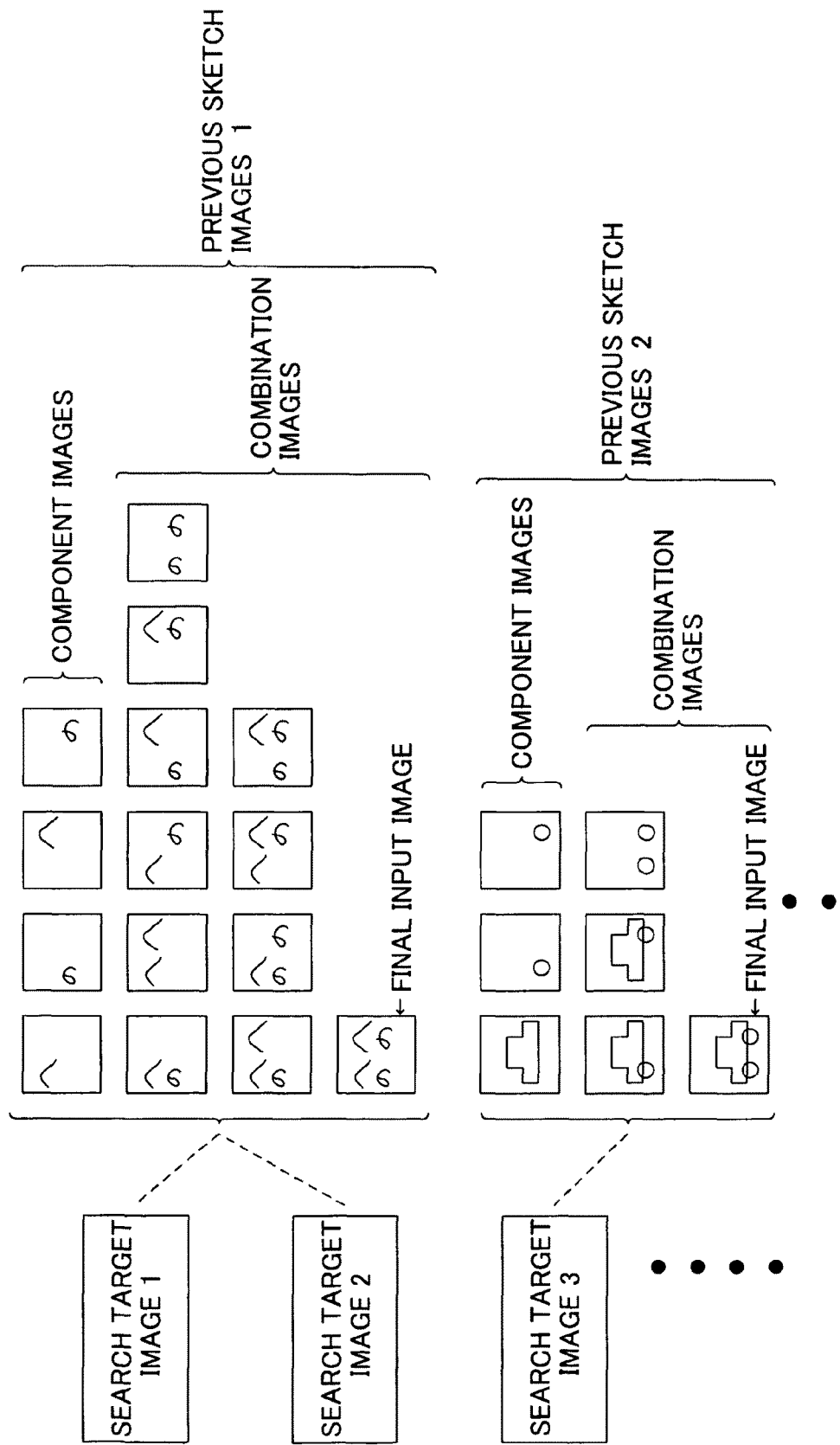
FIG. 2 is an explanatory view schematically showing a relation among search target images, component images and combination images.

On the other hand, the previous sketch images mentioned here are images to be used in searching through the search target images upon the execution of the first image retrieval program, and comprise component images and at least one combination image linked to at least one search target image. The component images mentioned here are images constituting a part or the whole of an input image which was finally input in order to extract a search target image which a user wanted when retrieval for the search target image was carried out by the execution of the first image retrieval program in the past. The at least one combination image is one or more images obtained by combining a plurality of component images constituting one input image with each other. FIG. 2 schematically shows an example of a relation among search target images, component images, and combination images. In FIG. 2, previous sketch images 1 are linked to search target images 1, 2 and previous sketch images 2 are linked to a search target image 3. In the previous sketch images 1, 2, the input images finally input in order to extract the search target images 1 to 3 which users wanted are the combination images shown in the last rows among the combination images in the figure, respectively.

The input unit 105 comprises a keyboard 105a and a mouse 105b serving as a pointing device, and inputs various kinds of instructions from a user and various kinds of data to the CPU 101 through the main memory 102. Specifically, the input unit 105 inputs an instruction to execute the first image retrieval program and a sketch image which serves as search criteria for search target images to the CPU 101. The display unit 106 comprises a liquid crystal display unit and displays operating conditions of the CPU 101 and execution states of various kinds of programs to a user. Specifically, in executing the first image retrieval program, the display unit 106 displays a user interface for drawing a sketch image which serves as search criteria for search target images, and a search target image as a search result.

(Operation of the Image Retrieval Device 100)

Operation of the image retrieval device 100 thus constructed will be described. As a prerequisite of a process of retrieving a search target image by the image retrieval device 100, the auxiliary storage unit 103 of the image retrieval device 100 stores search target images to be searched by the first image retrieval program in a predetermined storage area beforehand, together with search target image feature amounts calculated based on the search target images. In addition, a predetermined storage area of the auxiliary storage unit 103 stores previous sketch images used in the past for extracting a search target image in retrieval for the search target image by the execution of the image retrieval program in a manner to be linked to the extracted search target image. In this case, together with the previous sketch images, the auxiliary storage unit 103 stores previous image feature amount calculated based on the previous sketch images. The search target image feature amounts and the previous image feature amounts will be described later.

Figure 3:
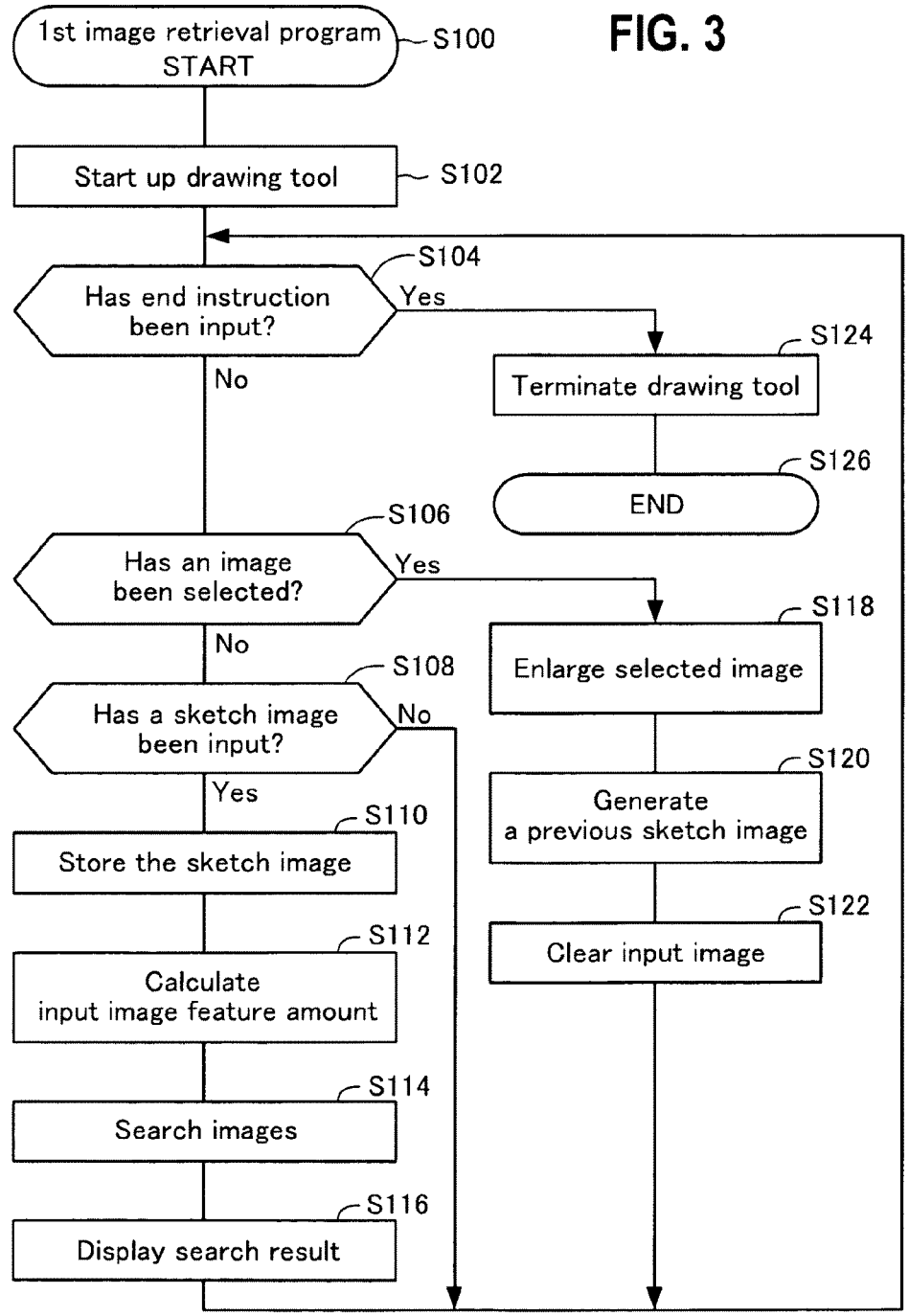
FIG. 3 is a flowchart of a first image retrieval program to be executed by the CPU shown in FIG. 1.

First, a user supplies power to the image retrieval device 100. Upon this, the image retrieval device 100 executes a predetermined program such as an OS not shown and goes into a standby state, waiting for an instruction from a user. Next, the user starts an image retrieval operation by using the image retrieval device 100. Specifically, the user operates the input unit 105 and instructs the image retrieval device 100 (the CPU 101) to start image retrieval. In response to this instruction, the image retrieval device 100 (the CPU 101) starts a first image retrieval program shown in FIG. 3 in a step S100 and starts up a drawing tool in a step S102.

Figure 4:
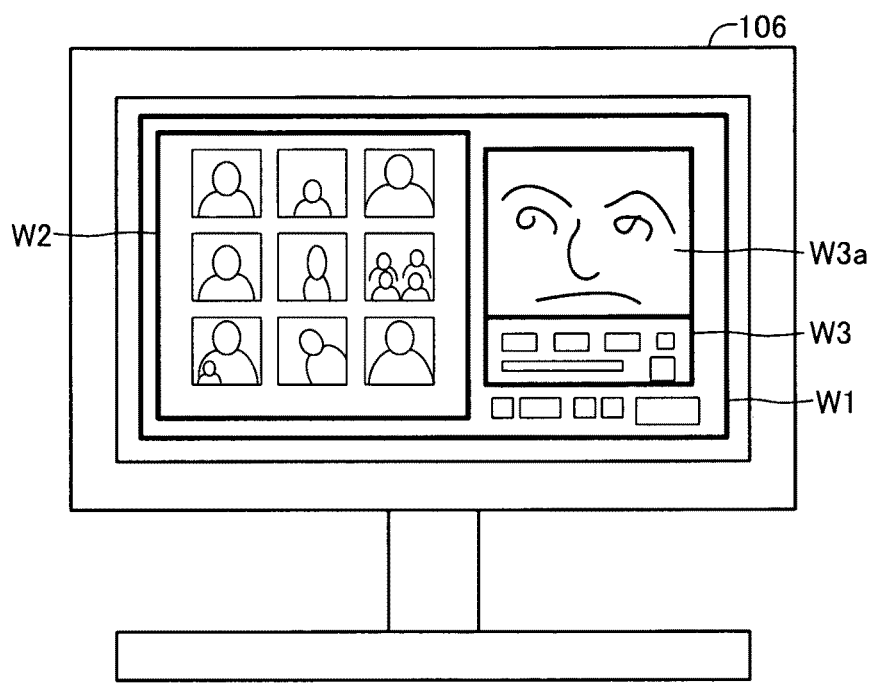
FIG. 4 is an explanatory view showing a display state of the display unit shown in FIG. 1.

The drawing tool is a user interface for inputting sketch images constituted by line pictures by using the mouse 105b of the input unit 105, and is realized by executing a drawing tool program not shown and prepared separately from the first image retrieval program. An example of a display state of the display unit 106 in executing the first image retrieval program and the drawing tool program is shown in FIG. 4. In FIG. 4, a window W1 displayed on an almost full display screen at the backmost in a depth direction of the display unit 106 is a basic operation screen for the first image retrieval program. A window W2 displayed in the front of the display screen in a manner to cover a left half of this window W1 is an area for displaying search target images, and a window W3 displayed on a right half of the display screen is the drawing tool. Display scales, mutual positions, and stack order in the depth direction of these windows W1 to W3 can be changed arbitrarily by a user's operation of the mouse 105b.

In the window W3, there is a drawing area W3a for drawing a sketch image. A user can draw an image comprising a line picture within the drawing area W3a (in FIG. 4 a user has drawn a face) by moving a cursor (not shown) displayed on the display screen of the display unit 106 within the drawing area W3a by operating the mouse 105b while pressing a mouse button (not shown) of the mouse 105b, namely, dragging the mouse 105b. Sketch images drawn by this drawing tool are displayed as bitmapped (Raster) image data.

Next, in a step S104, the image retrieval device 100 determines whether the first image retrieval program should end or not. Specifically, the image retrieval device 100 continues to determine that the answer is NO until detecting a user's instruction to end the first image retrieval program, and goes to a step S106. On the other hand, when the image retrieval device 100 detects a user's input of an instruction to end the first image retrieval program, it determines that the answer is YES in this decision process and goes to a step S124.

Next, in a step S106, the image retrieval device 100 determines whether a search target image has been selected or not. This decision process in the step S106 is to detect whether a user has selected (or designated) an image or not in at least one search target image displayed as an image search result in the window W2. Therefore, the image retrieval device 100 continues to determine that the answer is NO in this decision process until a user selects an image in the at least one search target image displayed in the window W2, and goes to a step S108. On the other hand, when a user selects an image in the at least one search target image displayed in the window W2, the image retrieval device 100 determines that the answer is YES in this decision process and goes to a step S118.

Next, in a step S108, the image retrieval device 100 determines whether a sketch image has been input or not. Specifically, the image retrieval device 100 continues to determine that no sketch image has been input and the answer is NO in this decision process until an input image is acquired through the drawing tool, and returns to the step S104. Accordingly, the image retrieval device 100 repeatedly executes the processes of the step S104 to the step S108 until an image is acquired through the drawing tool.

On the other hand, when the image retrieval device 100 acquires an input image through the drawing tool, it determines that a sketch image has been input and the answer is YES in this decision process, and goes to a step S110. In this case, acquisition of an input image through the drawing tool is carried out by detecting that a user ends dragging a cursor within the drawing area W3a. That is to say, every time a user draws a single line within the drawing area W3a, an input image is acquired.

Next, in a step S110, the image retrieval device 100 stores an input sketch image. In this case, the auxiliary storage unit 103 of the image retrieval device 100 temporarily stores the entire image drawn within the drawing area W3a as one input image, in addition to an image of a single line drawn most recently within the drawing area W3a.

Next, in a step S112, the image retrieval device 100 calculates a feature amount about the stored input image. The feature amount mentioned here is quantified information about a feature of an image based on an attribute (for example, brightness information, color information, image frequency, histogram and shape) of the image, and comprises a first feature amount and a second feature amount. In this first preferred embodiment, each feature amount is calculated based on shape of each image by applying the concept of LBP (Local Binary Patterns) in texture analysis.

Figure 5:
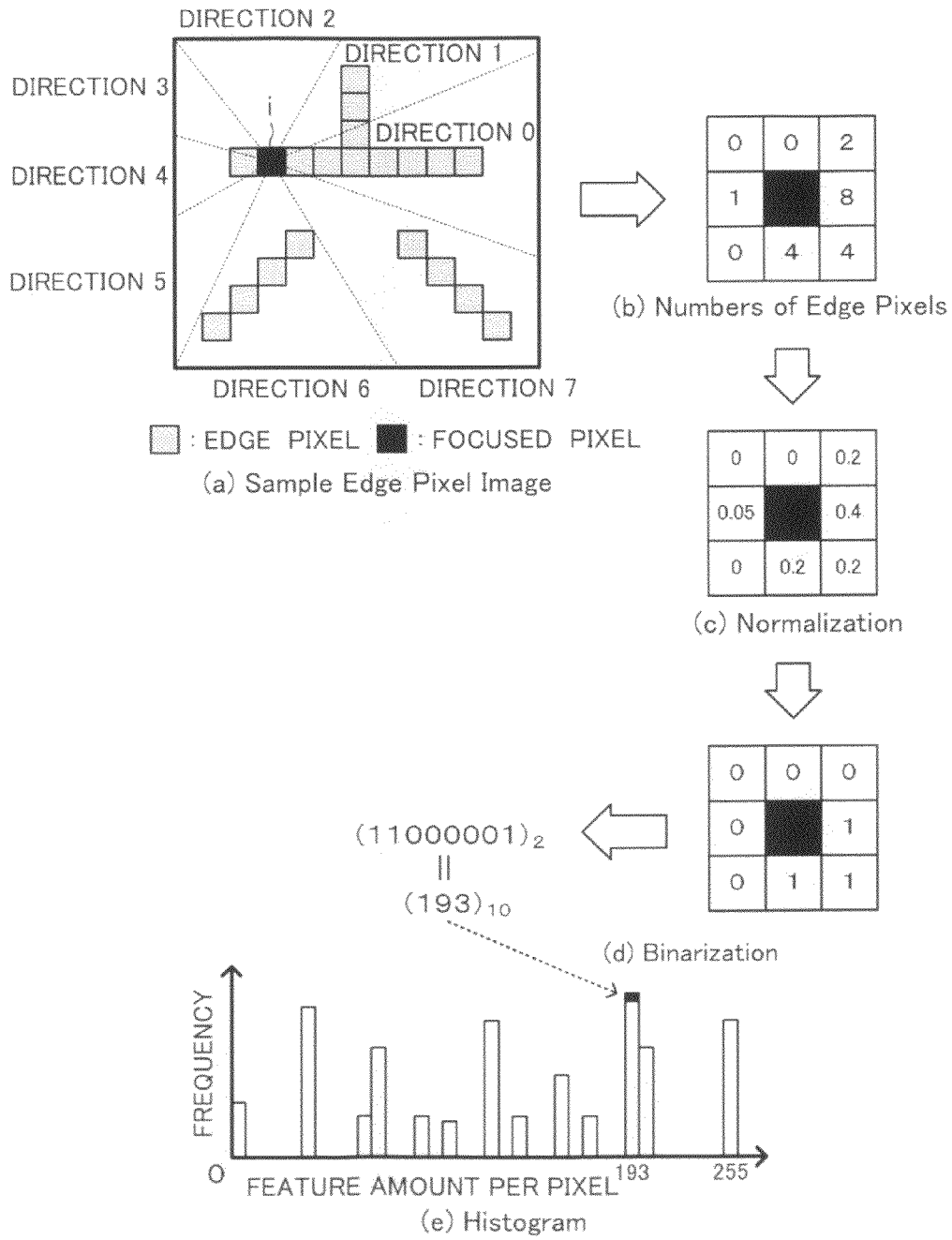
FIGS. 5(a) to 5(e) are explanatory views for explaining a process of calculating a first feature amount of a feature amount.

First, a process of calculating the first feature amount will be described. Since this process of calculating the first feature amount is already known, only a brief description will be given. (For more detail, see "Journal of the Institute of Image Information and Television Engineers Vol. 56, No. 4, pp. 653-658 (2002)" by the Institute of Image Information and Television Engineers in Japan). The image retrieval device 100 retrieves line pixels of an input image by raster scanning. This line pixel retrieval process is carried out by such processes as original image smoothing, edge (contour) detection, binarization, and line thinning. Next, as shown in FIGS. 5(a), 5(b), the image retrieval device 100 calculates the total number of line pixels $C_{ix}$ existing in directions x (a direction 0 to a direction 7) when each retrieved line pixel is regarded as a focused pixel i. In this case, since the total number of line pixels in an image is different depending on the image to be processed, threshold processing is executed by using a value obtained by normalizing the total number $C_{ix}$ of line pixels in each direction with the total number of line pixels. Thus obtained is a feature amount irrelevant to image size.

Next, the image retrieval device 100 calculates a critical value $S_{ix}$ by substituting the total number of line pixels $C_{ix}$ into Math. 1 below, and calculates $f_{ix}$ by using Math. 2, as shown in FIG. 5(c). In Math. 1 and Math. 2, C is the total number of line pixels and Th is a threshold value for frequency determination. In this preferred embodiment, in consideration of division into 8 directions, $\frac{1}{8}$=0.125, Th=0.15.

$$S_{ix} = \begin{cases} \dfrac{C_{ix}}{C-1} & \text{(when } C \neq 1) \\ 0 & \text{(when } C = 1) \end{cases} \quad [\text{Math. 1}]$$

$$f_{ix} = \begin{cases} 0 & \text{(when } S_{ix} \leq Th) \\ 1 & \text{(when } S_{ix} > Th) \end{cases} \quad [\text{Math. 2}]$$

Next, as shown in FIGS. 5(d), 5(e), the image retrieval device 100 generates an 8-bit binary number by regarding each number in 8 directions as each bit, and maps a decimal number di ($0 \leq d_i \leq 255$) into which this binary number ($f_{i7}$, $f_{i6}$, $f_{i5}$, $f_{i4}$, $f_{i3}$, $f_{i2}$, $f_{i1}$, $f_{i0}$) is converted in a histogram. Thus obtained is a feature amount irrelevant to position. These respective processes are carried out about all C pieces of line pixels and the relative positional relations among the line pixels are summarized in a histogram as a 256-dimensional first feature amount. Mapping in a histogram is thus carried out for each focused pixel i and a global relative positional relation of each line pixel to the entire line pixels is stored. That is to say, a first feature amount is calculated about a contour constituting the entire input image based only on shape information irrelevant to size, location or direction.

Next, a process of calculating the second feature amount will be described. This second feature amount is calculated by using what we call Higher-order Local AutoCorrelation (HLAC) feature function. The HLAC feature function mentioned here is that when a brightness value of a focused pixel i is f(i), the Nth-order autocorrelation function around the focused pixel i with N displacements ($a_1, a_2, \ldots, a_n$) around the focused pixel i is defined by Math. 3 below.

$$x(a_1, \Lambda, a_n) = \int I(i)I(i+a_1) \Lambda I(i+a_1) dr \quad [\text{Math 3}]$$

Figure 6:
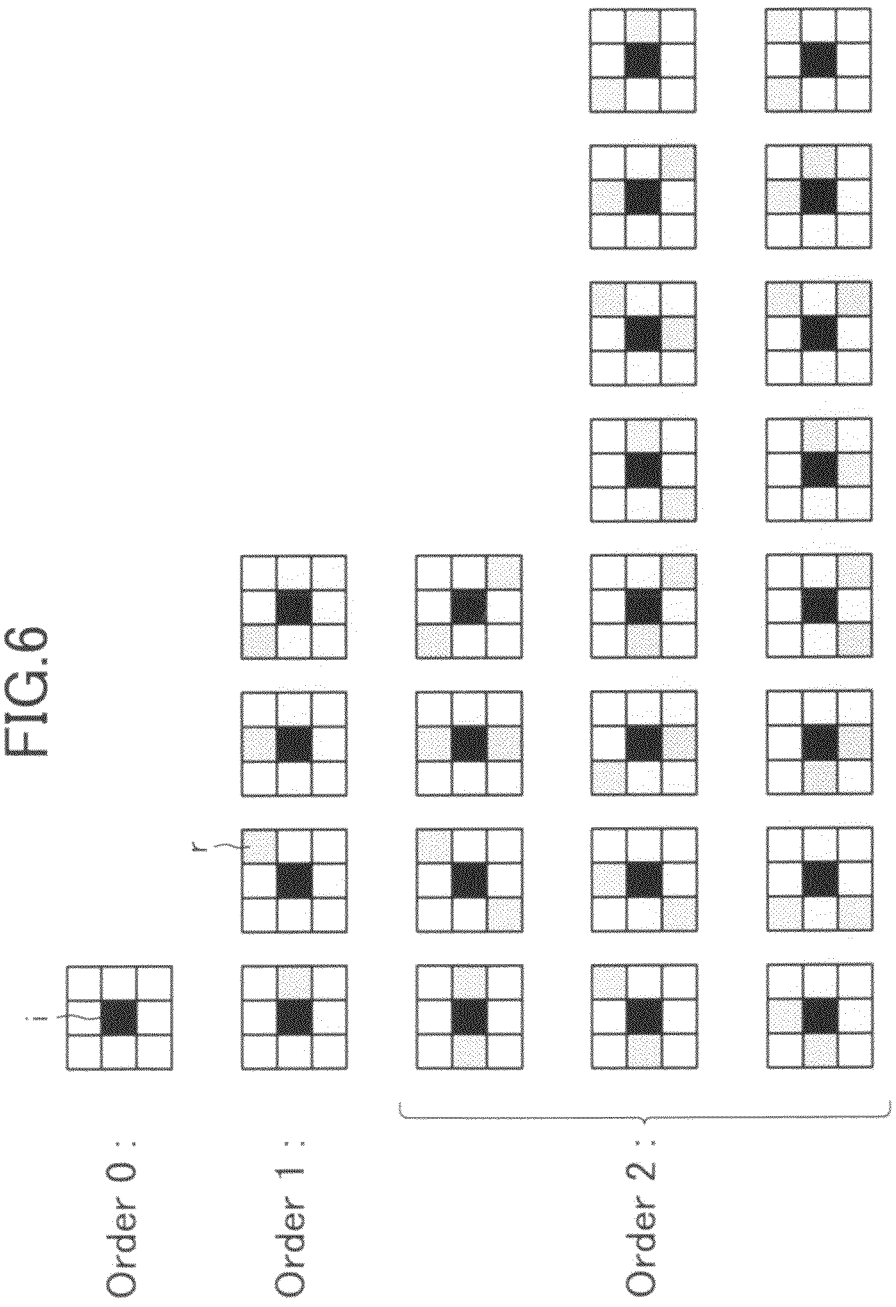
FIG. 6 is an explanatory view showing 25 kinds of presence and absence patterns used in a calculation process of a second feature amount of the feature amount.

In the present invention, in order to calculate a local feature, the order N in Math. 3 is restricted to up to the second and the range of displacements ($a_1, a_2, \ldots a_n$) is restricted in a 3×3 matrix. Accordingly, by eliminating the displacements which are equivalent by parallel shift, patterns of the presence or absence of pixels r adjacent to a focused pixel i with respect to the focused pixel i can be classified into 25 kinds of presence and absence patterns, as shown in FIG. 6. In a 3×3 matrix with a focused pixel i as its center, "the displacements which are equivalent by parallel shift" mentioned here are other pixel patterns having the same positional relation between pixels r adjacent to a focused pixel i and the focused pixel i with respect to respective shift pixel patterns obtained by horizontally, vertically, or diagonally left or right shifting (or displacing in parallel) the focused pixel i and the adjacent pixels r respectively only by one square in the 3×3 matrix, while keeping the relative positional relation among the respective pixels.

Figure 7:
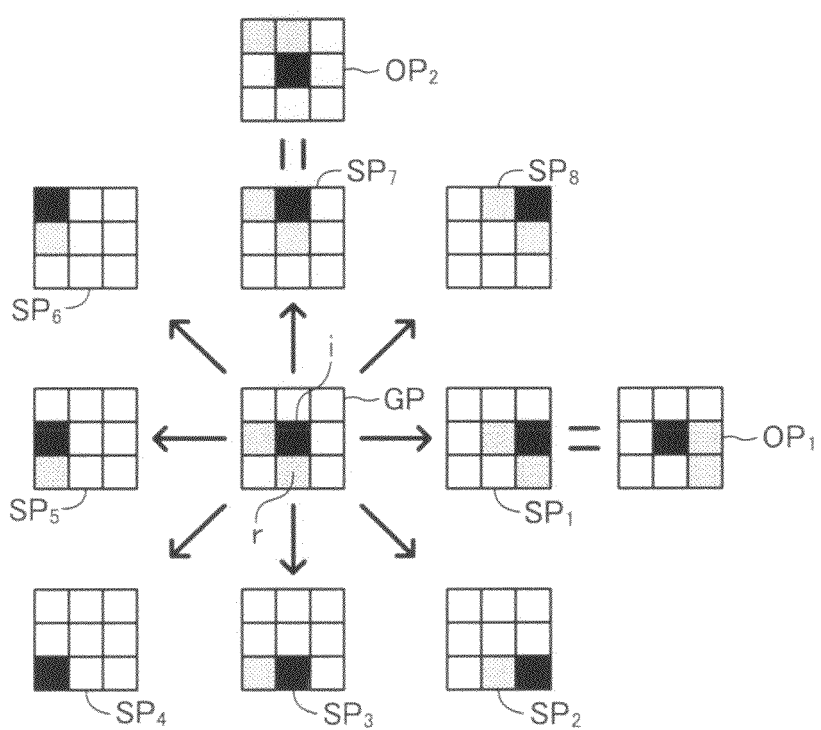
FIG. 7 is an explanatory view for explaining pixel patterns which are equivalent to each other in specifying 25 kinds of presence and absence patterns.

For example, in a case of a pixel pattern GP comprising two adjacent pixels r around a focused pixel i, shift pixel patterns $SP_1$ to $SP_8$, which are respectively obtained by shifting the pixel pattern GP horizontally, vertically, and diagonally, left or right only by one square in a 3×3 matrix, are as shown in FIG. 7. Of these shift pixel patterns $SP_1$ to $SP_8$, the shift pixel patterns $SP_1$ and $SP_7$ are the same as other pixel patterns $OP_1$, $OP_2$ comprising two adjacent pixels r around a focused pixel i. Therefore, the pixel patterns $OP_1$, $OP_2$ are grouped together in the pixel pattern GP as equivalent pixel patterns.

Figure 8:
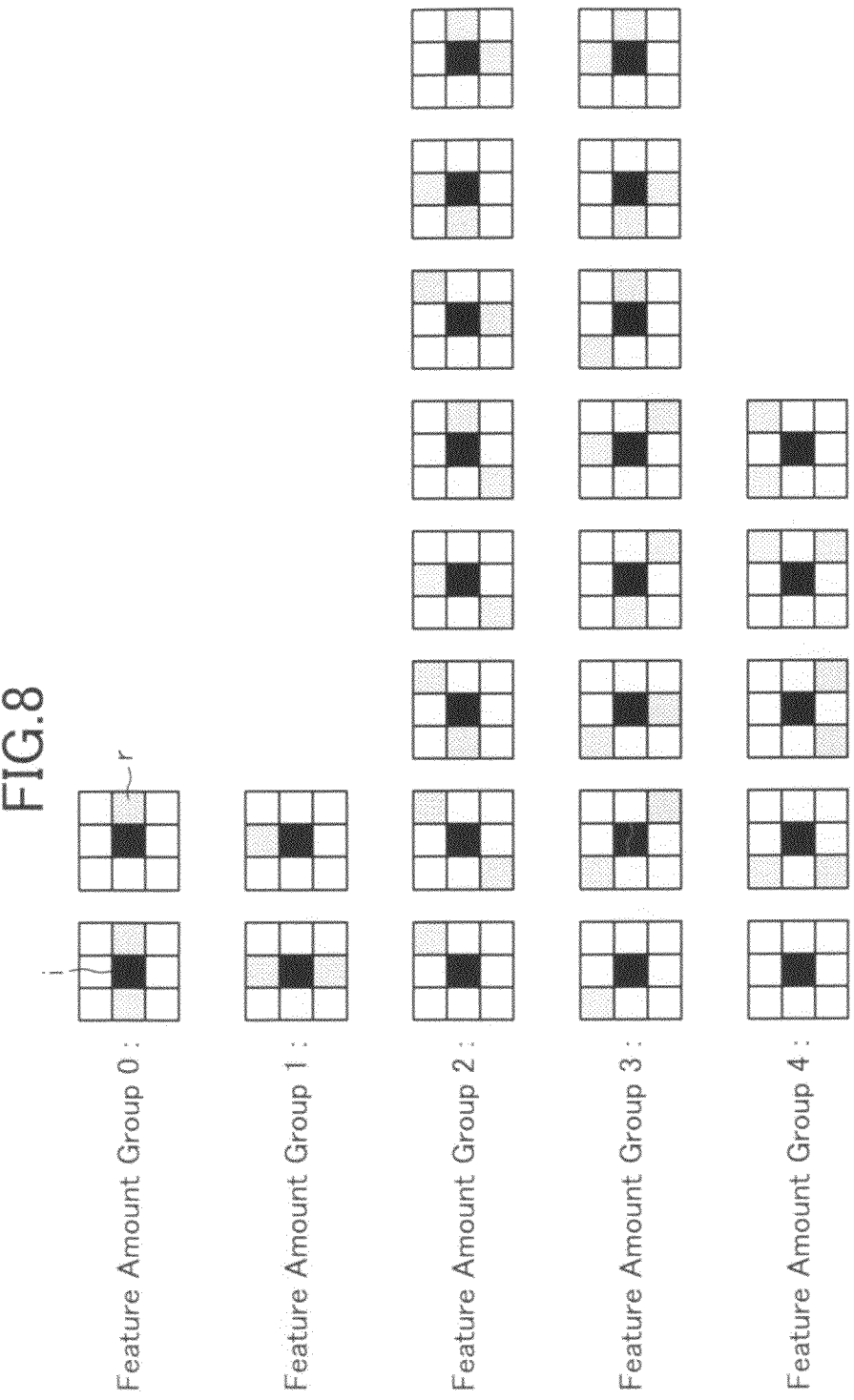
FIG. 8 is an explanatory view showing 5 kinds of feature amount groups of presence and absence patterns constituting the second feature amount of the feature amount.

Moreover, in the present invention, these 25 kinds of presence and absence patterns are classified into 5 kinds of feature amount groups. Specifically, as shown in FIG. 8, a feature amount group 0 having a positional relation in which a focused pixel i and one or two adjacent pixels r are located horizontally with respect to each other, a feature amount group 1 having a positional relation in which the focused pixel i and one or two adjacent pixels r are located vertically with respect to each other, a feature amount group 2 having a positional relation in which the focused pixel i and one or two adjacent pixels r are located diagonally right with respect to each other, a feature amount group 3 having a positional relation in which the focused pixel i and one or two adjacent pixels r are located diagonally left with respect to each other, and a feature amount group 4 having a positional relation which does not belong to any of the feature amount groups 0 to 3.

In this case, the feature amount group 4 includes a pattern in which no adjacent pixel r is located around the focused pixel i. That is to say, 5 kinds of feature amount groups 0 to 4 are groups obtained by classifying the positional relations of pixel(s) r adjacent to a focused pixel i, including the absence of any adjacent pixel r around the focused pixel i, with respect to the focused pixel i into 5 kinds of positional relations. This grouping of 25 kinds of presence and absence patterns is based on the fact that the present inventor has conducted a test on matching each pixel constituting line pixels in an original image to the 25 presence and absence patterns and has found that frequency distribution tends to be concentrated around particular presence and absence patterns.

That is to say, the image retrieval device 100 executes a matching process of specifying which of the 25 kinds of presence and absence patterns a positional relation of pixels r adjacent to a focused pixel i (including a relation in which no adjacent pixel r is located around the focused pixel i) with respect to the focused pixel i in the aforementioned retrieved line pixels falls under. Then the image retrieval device 100 classifies the focused pixel i into any of the feature amount groups 0 to 4 of the aforementioned 5 kinds of feature amount groups based on the presence and absence patterns specified by the matching process.

For example, the focused pixel i shown in FIG. 5(a) is classified into the feature amount group 0, because the focused pixel i and two adjacent pixels r are located horizontally. In another case, for example, when only one adjacent pixel r is located just under a focused pixel the focused pixel i is classified into the feature amount group 1, because this positional relation corresponds to a positional relation in which only one adjacent pixel r is located just above a focused pixel i. In another case, for example, the pixel patterns $OP_1$, $OP_2$ shown in FIG. 7 are classified into the feature amount group 3, because the pixel patterns $OP_1$, $OP_2$ are equivalent to the pixel pattern GP. Moreover, in a case where three or more adjacent pixels r exist with respect to a focused pixel i, this positional relation is classified into the feature amount group 4 because this positional relation does not fall under any of the feature amount groups 0 to 3. It should be noted that since line thinning has been executed in the line pixel retrieval process prior to the processes of calculating the first feature amount and the second feature amount, it is rare that three or more adjacent pixels r exist with respect to each focused pixel i and such a focused pixel i having three or more adjacent pixels r gives little effect on subsequent processes.

The image retrieval device 100 executes these processes about all line pixels and summarizes the relative positional relations among all the line pixels in a histogram as a 5-dimensional second feature amount. By thus mapping the relative positional relations about every focused pixel i on a histogram, the image retrieval device 100 stores local relative positional relations of line pixels to adjacent pixels r. That is to say, the image retrieval device 100 calculates a second feature amount about a contour constituting the entire input image based only on shape information irrelevant to size, location or direction.

Figure 9:
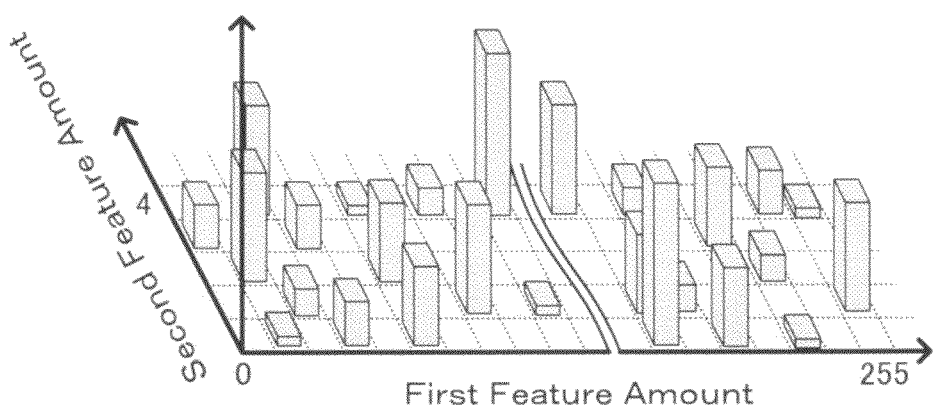
FIG. 9 is an explanatory view showing an image of statistical processing of the first feature amount and the second feature amount in a process of calculating the feature amount.

Then, the image retrieval device 100 executes a process of statistically processing the calculated first feature amount and the calculated second feature amount into one histogram and normalizes a result of this statistical processing into a size-invariant feature amount. FIG. 9 shows an image of this statistical processing of the first feature amount and the second feature amount into one histogram. Owing to these processes, a 1280-dimensional (256 dimensions of a first feature amount×5 dimensions of a second feature amount) feature amount about a contour is calculated based only on shape information irrelevant to size, location or direction.

Additionally, the image retrieval device 100 calculates feature amounts about images obtained by rotating an input image, and about a mirror image of the input image, respectively. Specifically, in calculating first feature amounts about images obtained by rotating the input image, the image retrieval device 100 calculates first feature amounts about images which are obtained by rotating the input image into 8 directions, by rotating the binary number shown in FIG. 5(d) one bit by one bit. Furthermore, in calculating second feature amounts about the images obtained by rotating the input image, the image retrieval device 100 calculates the second feature amounts by using presence and absence patterns in which adjacent pixels are rotated into the same directions as the aforementioned rotated directions.

On the other hand, in calculating a first feature amount about a mirror image of an input image, the image retrieval device 100 calculates a first feature amount about a binary number obtained by reordering each bit of the binary number shown in FIG. 5(d) so as to have a mirror relation. Furthermore, in calculating a second feature amount about the mirror image of the input image, the image retrieval device 100 calculates a second feature amount by interchanging the feature amount group 3 (diagonally right relation) with the feature amount group 4 (diagonally left relation). Accordingly, the image retrieval device 100 can easily calculate feature amounts about the images obtained by rotating the input image and the mirror image of the input image without rotating the original image or generating a mirror image. Thus, an input image feature amount, which is a feature amount about the entire input image, is calculated by this feature amount calculation process in the step S112. That is to say, this feature amount calculation process in the step S112 corresponds to "input image feature amount calculating means" according to the present invention.

It should be noted that search target image feature amounts about search target images and previous image feature amounts about previous sketch images stored in the auxiliary storage unit 103 of the image retrieval device 100 are values calculated by executing the abovementioned respective processes. In this case, in a similar way to the above, search target images are converted into images in a bitmap format and subjected to processes such as smoothing, edge (contour) detection, binarization, and line thinning, and then the feature calculation process is executed about the obtained search target images.

Next, in a step S114, the image retrieval device 100 executes a process of searching through the search target images. Specifically, the image retrieval device 100 measures image distance of search target images and previous sketch images (component images and at least one combination image) from the input image and arranges the search target images and the previous sketch images in an order of shorter image distance. More specifically, the image retrieval device 100 calculates vector distance (Euclidean distance $D_i$) in 1280-dimensional space of the search target image feature amounts and the previous image feature amounts from the input image feature amount by using Math. 4 below, and arranges the corresponding search target images and the corresponding previous sketch images in an order of shorter calculated vector distance.

$$D_i = \min_{k=1,2,\ldots K} \left\{ \sqrt{\sum_{j=0}^{1280} (F_{sj} - F_{ij})^2} \right\} \quad \text{[Math. 4]}$$

In the above Math. 4, $F_s$ is an input image feature amount, $F_i$ is a search target image feature amount or a previous image feature amount, j is each dimension of a 1280-dimensional feature amount. K is the number of patterns for correspondence to rotated images and a mirror image. In a case of ordinary search without considering rotated images or a mirror image, K=1. In a case of search in consideration of rotated images, K=2. In a case of search in consideration of a mirror image, K=3. In a case of search in consideration of both rotated images and a mirror image, K=16. Thus, a process of comparing rotated images and/or a mirror image of an input image with search target images and previous sketch images is executed, and the search target images and the previous sketch images are arranged in an order of higher similarity to the input image, including identification. The search target images and the previous sketch images arranged in the order of higher similarity to the input image in this search process in the step S114 correspond to "similar previous images" according to the present invention. That is to say, the process of comparing the search target images with the input image and extracting at least one search target image having higher similarity in the step S114 corresponds to "search target image extracting means" according to the present invention, and the process of comparing previous sketch images with the input image and extracting at least one previous sketch image having higher similarity in the step S114 corresponds to "similar previous image extracting means" according to the present invention.

In this process of searching through the search target images in the step S114, the search target images and the previous sketch images are respectively compared with the input image. In this case, if some user retrieved the same search target image in the past, it is often the case that the input image is more similar to a previous sketch image which the user drew in order to retrieve that search target image than to the very search target image a user wants. Therefore, when some user retrieved the same search target images in the past, that desired search target image can more easily be extracted at a higher ranking by using the previous sketch image.

Next, in a step S116, the image retrieval device 100 has the search results displayed on the display unit 106. Specifically, the image retrieval device 100 has the search target images displayed in the window W2 in an order of being arranged in the search process in the step S114. In this case, when the extracted images are search target images, the image retrieval device 100 allows them to be displayed on the display unit 106 as they are. When the extracted images are previous sketch images, the image retrieval device 100 has search target images linked to the previous sketch images displayed on the display unit 106. That is to say, this process of displaying at least one search result in the step S116 corresponds to "search result output means" according to the present invention. After having the search results displayed on the display unit 106, the image retrieval device 100 returns to the step S104.

Upon this, the user visually checks the search results displayed on the display unit 106 and when the search results do not include the search target image which the user wants, the user continues to input the sketch image. In this case, every time the user adds a drawn line to the sketch image, the process of searching through the search target images is executed and search results which are updated every time the user draws a line are displayed on the display unit 106 (the step S108 to the step S116). In this case, too, when some user retrieved the same search target image in the past as mentioned above, because it is often the case that the input image has a higher similarity to the previous sketch image drawn in retrieving that search target image than to the desired search target image, the desired search target image can be retrieved in a stage where the volume of the input image is smaller.

When the search target image which the user wants is displayed in the window W2 of the display unit 106, the user operates the mouse 105*b* to select (click) the search target image which the use wants. Upon this operation, the image retrieval device 100 determines that the answer is YES in the decision process in the step S106 in the first image retrieval program and goes to a step S118. In the step S118, the image retrieval device 100 has the search target image selected by the user displayed in a larger scale.

Then, in a step S120, the image retrieval device 100 generates previous sketch images. Specifically, the image retrieval device 100 defines the input image stored at the moment as a final input image used for extracting that search target image and permanently stores images of all lines constituting that input image as component images in a manner to be linked to the search target image selected in the step S106. Moreover, the image retrieval device 100 calculates the feature amount about each component image and stores them as previous image feature amounts.

Furthermore, the image retrieval device 100 generates at least one combination image by combining the component images constituting the input image which has been defined as a final input image with each other and permanently stores it in a manner to be linked to the search target image selected in the step S106. In this case, too, the image retrieval device 100 calculates the feature amount about the at least one combination image, like the component images, and stores it as a previous image feature amount. These processes in the step S120 respectively correspond to "component image storing means", "combination image generating means", and "previous image feature amount calculating means" according to the present invention. Then, in a step S122, the image retrieval device 100 clears (erases) the image drawn within the drawing area W3*a* of the window W3, and returns to the step S104.

On the other hand, when the search target image which the user wants is not included in the search results displayed in the window W2 of the display unit 106 but the process of searching through the search target images is to be ended, the user operates the mouse 105*b* to click a search end icon (not shown) provided in the window W1. Upon input of an end instruction, the image retrieval unit 100 determines that the answer is YES in the decision process in the step S104 and goes to a step S124. In the step S124, the image retrieval device 100 terminates the execution of the drawing tool. Then, in a step S126, the image retrieval device 100 ends the execution of this image retrieval program. That is to say, when the image retrieval program is ended without selecting a search target image in the search results, the process of generating previous sketch images is not executed.

As understood from the foregoing description of the operation, according to the first preferred embodiment, the image retrieval device 100 compares an input image feature amount based on an attribute of an input image with search target image feature amounts based on an attribute of search target images to be searched and previous image feature amounts based on an attribute of previous sketch images and thereby extracts the same or a similar image to the input image. In this case, each of the feature amounts about the input image, the search target images and the previous sketch images comprises a first feature amount expressing a relative positional relation of each pixel constituting an image with respect to pixels of the entire image, and a second feature amount expressing a relative positional relation of each pixel constituting the image with respect to its adjacent pixels. Accordingly, in response to an input image, search target images and previous sketch images can be specified based on shape information irrelevant to size, location or direction from a global viewpoint (the first feature amount) and a local viewpoint (the second feature amount). As a result of these, in response to the input image, a search target image which a user wants can be retrieved accurately in a short time. Besides, in this case, the second feature amount is calculated by statistically processing presence and absence patterns of pixels adjacent to a focused pixel with respect to the focused pixel into 3 to 5 kinds of feature amount groups. Accordingly, the second feature amount needs very little information to be stored when compared to a case where the second feature amount is calculated by statistically processing each of all 25 kinds of presence and absence patterns of relative positional relations and the results are stored, so utilization of storage capacity of the auxiliary storage unit 103 of the image retrieval device 100 can be kept low.

Furthermore, according to the above first preferred embodiment, component images and at least one combination image of an image which some user input in the past in order to retrieve a search target image are stored in a manner to be linked to that retrieved search target image, and every time a single line is drawn by a user and its image is input, the image retrieval device 100 compares the entire input image the user has drawn with the stored component images and the at least one combination image constituted by the component images, and extracts a component image or a combination image which is similar to the entire input image. Then the image retrieval device 100 outputs a search target image linked to the extracted component image or combination image. That is to say, an input image which a user has drawn in order to retrieve a search target image has a very strong possibility of being more similar to a previous image which the same or a different user input in the past in order to retrieve the same search target image than to the very search target image to be retrieved. Therefore, a search target image which a user wants can be extracted more easily by comparing an input image which the user has drawn with previous images than comparing that input image with search target images. Besides, in this case, the desired search target image can be retrieved more quickly by comparing an input image which the user has drawn with component images constituting the previous images or at least one combination image obtained by combining the component images every time a single line is drawn by a user and its image is input than by comparing an image which the user has finally input with the previous images some user input in the past. As a result, in response to an input image which the user has drawn, the search target image which the user wants can be retrieved accurately in a short time.

Moreover, the present invention can be embodied in other forms than the first preferred embodiment described above and a variety of modifications are possible without departing from the spirit of the present invention.

For example, in the above first preferred embodiment, the auxiliary storage unit 103 is constructed to store combination images constituting previous sketch images. However, since the combination images are constituted by combinations of component images, the combination images do not necessarily have to be generated and stored. That is to say, in the process of searching through the search target images in the step S114 of the first image retrieval program, the search process can be carried out by generating at least one combination image and calculating a feature amount about the at least one combination image by using the stored component images. In this case, storage area for storing the combination images and feature amounts about the combination images can be omitted, so memory capacity of the auxiliary storage unit 103 can be utilized effectively.

Moreover, in the first preferred embodiment, upon selection of a certain search target image in at least one search result displayed on the display unit 106, the image retrieval device 100 is constructed such that previous sketch images are generated in a manner to be linked to the selected search target image. However, the search target image to be linked to the previous sketch images does not necessarily have to be a search target image extracted from at least one search result. That is to say, sketch images input in order to extract (or retrieve) a certain search target image can be defined as previous images. In other words, even sketch images which were unable to extract a search target image some user wanted can be used as previous sketch images as long as they are sketch images which have a high possibility of being drawn in order to extract the same search target image. This also helps a search target image a user wants to be retrieved accurately in a short time in response to an input image the user has drawn.

Moreover, in the first preferred embodiment, the image retrieval device 100 is constructed such that search target images and previous sketch images are compared with an input image without distinguishing the search target images and the previous sketch images in the step S114. However, since the previous sketch images are images which some user used in the past and have higher similarity to the input image, the image retrieval device 100 can be constructed such that the previous sketch images are compared with the input image in priority to search target images. In this case, it is preferable that at least one combination image constituted by component images in the same number as the number of component images constituting the input image is preferentially compared with the input image. Owing to these, a desired search target image can be retrieved more efficiently and accurately.

Moreover, in the first preferred embodiment, the image retrieval device 100 is constructed such that a desired search target image is retrieved based on component images and at least one combination image of an input image which some user input in the past. This is for retrieving a desired search target image efficiently based on a sketch image a user draws by hand. However, without using component images or at least one combination image, the desired search target image can be extracted only by a process of comparing an input image and search target images. Besides, even when a desired search target image is retrieved based on an image in a different input form from sketch images, for example, even when digital image data from an image scanner, a digital camera, a video camera, or on the Internet are directly imported and used as an input image, the desired search target image can be extracted only by the process of comparing an input image and search target images.

In this case, the image retrieval device 100 calculates an input image feature amount about an input image imported into the image retrieval device 100, and extracts a search target image by a process of comparing the calculated input image feature amount with search target image feature amounts. In this case, the process of calculating the input image feature amount about the input image can be executed in an external device which exports the input image to the image retrieval device 100. That is to say, the image retrieval device 100 can be constructed so as to import an input image and an input image feature amount about the input image from an external device. Furthermore, search target image feature amounts stored in the auxiliary storage unit 103 of the image retrieval unit 100 can be calculated in an external device which exports search target images to the auxiliary storage unit 103 and stored in the auxiliary storage unit 103. In this case, since the image retrieval device 100 does not need to be constructed to be able to calculate an input image feature amount and search target image feature amounts, the construction of the image retrieval unit 100 and various kinds of calculation processes can be simplified.

Moreover, in the above first preferred embodiment, the feature amount groups in the second feature amount constituting the feature amount are constituted by 5 kinds of presence and absence patterns into which presence and absence patterns of two or less adjacent pixels r around a focused pixel i are classified. However, according to experiments of the present inventor, it is possible to use 3 to 5 kinds of feature amount groups of presence and absence patterns of two or less adjacent pixels r around a focused pixel i. For example, the feature amount group 2 and the feature amount group 3 of the first preferred embodiment can be combined into one feature amount group 2 so as to use 4 kinds of feature amount groups in total, or the feature amount group 4 of the first preferred embodiment can be omitted so as to use 4 kinds of feature amount groups in total. Or, the feature amount group 2 and the feature amount group 3 of the first preferred embodiment can be combined into one feature amount group 2 and at the same time the feature amount group 4 of the first preferred embodiment can be omitted so as to use 3 kinds of feature amount groups in total. Owing to these constructions, the amount of information to be stored about the second feature amount is smaller than that of the first preferred embodiment, and as a result, utilization of storage capacity of the auxiliary storage unit 103 of the image retrieval device 100 can be further reduced.

Second Preferred Embodiment

Now, an image retrieval device according to a second preferred embodiment of the present invention will be described with reference to the drawings. This second preferred embodiment is based on the first preferred embodiment and is improved in accuracy in retrieving a search target image. Therefore, description of common portions will be omitted and only portions different from those of the first embodiment will be described.

This second preferred embodiment is characterized in that among the combination images constituting the previous sketch images of the first preferred embodiment, a combination image which has a higher possibility of being linked to the same search target image is used in priority to other combination images in the process of searching through the search target images. Specifically, among combination images linked to the same search target image and constituted by two component images which have consecutive drawing order numbers, that is to say, are drawn consecutively, a combination image which has a higher frequency of linkage to the same search target image than other combination images is distinguished from other combination images as a high frequency combination image and stored in the auxiliary storing unit 103.

When users draw input images in order to retrieve the same search target image, there are two or more component images which have a tendency to have consecutive drawing order numbers. With a focus on this fact, the present inventor has invented to compare an input image with a high frequency combination image, which is a combination image constituted by the same component images and drawn in the same drawing order. The present inventor has found that, for example, when drawing a face of a well-known Japanese cartoon character, drawing orders are often different with users but even in such a case an order of drawing an eye after an eyebrow is common among a lot of users. The present inventor has also found that when drawing a side view of a car, users have a strong tendency to draw a front tire and a rear tire consecutively, that is to say, to draw two circles along the horizontal line consecutively. The present invention has been completed with a focus on such an empirical rule.

Figure 10:
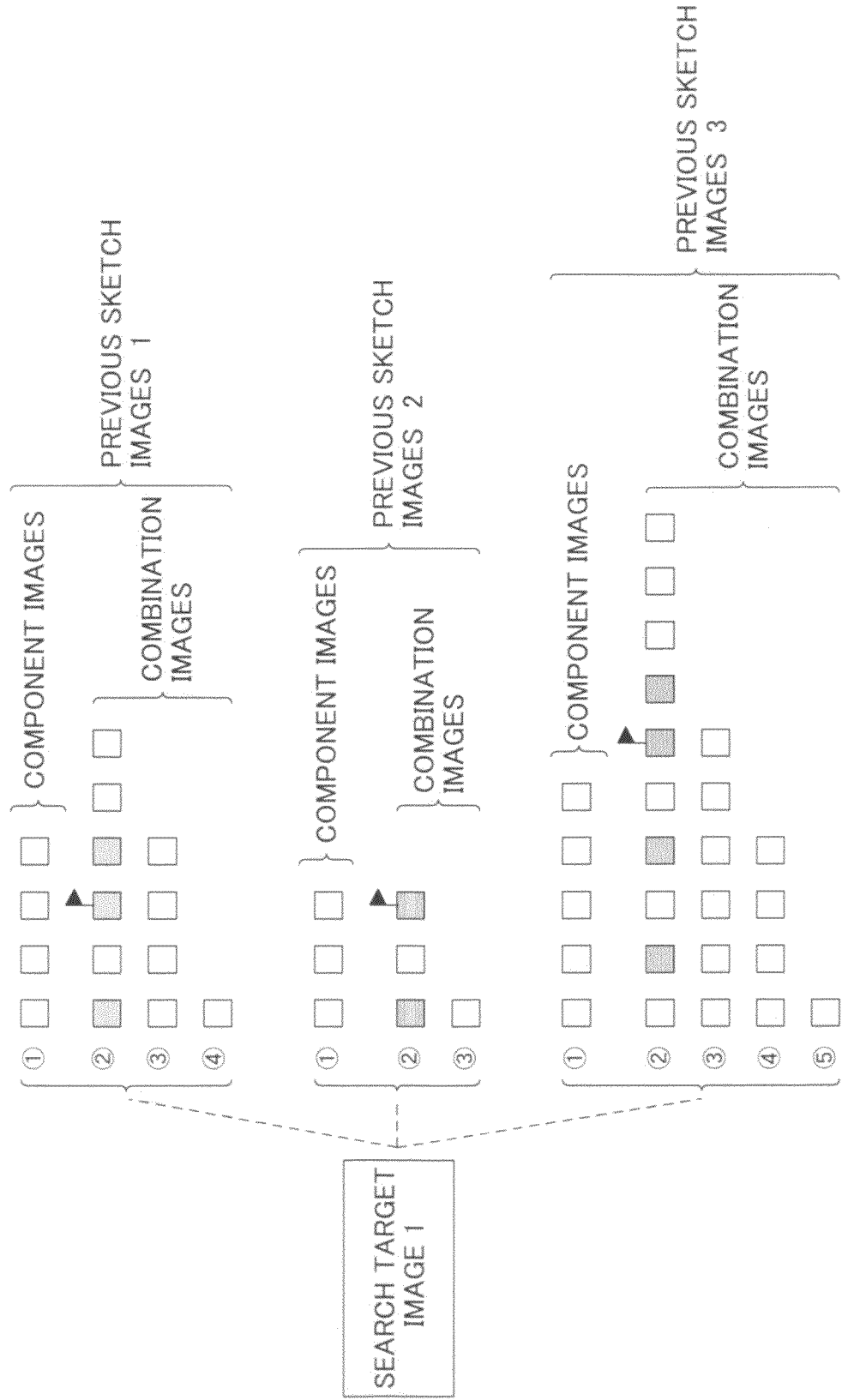
FIG. 10 is an explanatory view schematically showing a relation among a search target image, previous sketch images, and a high frequency combinations image.

FIG. 10 schematically illustrates a relation among a desired search target image, previous sketch images, and a high frequency combination image in the second preferred embodiment. Note that in FIG. 10, images actually drawn with the drawing tool are not shown. In this figure, a search target image 1 is stored in the auxiliary storage unit 103 in a manner to be linked to three kinds of previous sketch images 1 to 3. In the respective previous sketch images 1 to 3, circled numbers 1 to 5 designate the number of component images or the number of component images constituting combination images. Among combination images of the previous sketch images 1 to 3 constituted by two component images (combination images in a row with a circled number 2), a high frequency combination image is flagged so as to be distinguished from other combination images and stored in the auxiliary storage unit 103 beforehand. The high frequency combination image is a combination image which is constituted by two component images having consecutive drawing order numbers (gray hatched combination images in the figure) and has a higher frequency of linkage to the same search target images than other combination images.

(Operation of the Image Retrieval Device 100)

Next, operation of the image retrieval device 100 according to this second preferred embodiment will be described. As a premise of the process of retrieving a search target image by the image retrieval device 100, the auxiliary storage device 103 of the image retrieval device 100 stores search target images together with search target image feature amounts, and previous sketch images together with previous image feature amounts in a manner to be linked to a search target image in a similar way to the first preferred embodiment. Among combination images of the previous sketch images, the high frequency combination image is stored in a manner to be distinguished from other combination images.

Figure 11:
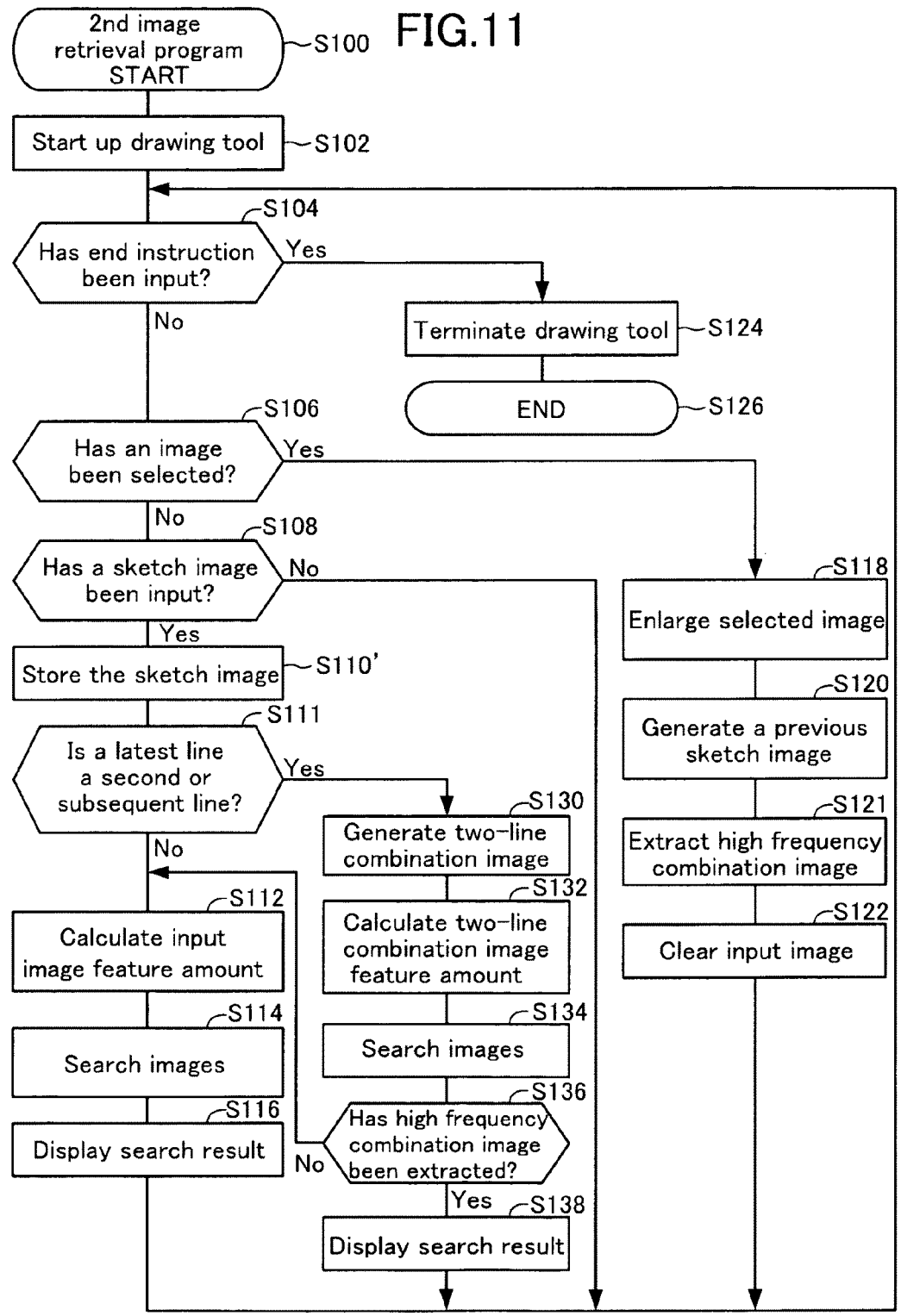
FIG. 11 is a flowchart of a second image retrieval program to be executed by the CPU shown in FIG. 1.

A user instructs the image retrieval device 100 to start image retrieval by a similar procedure to that of the first preferred embodiment. In response to this instruction, in the step S100, the image retrieval device 100 starts a second image retrieval program shown in FIG. 11. This second image retrieval program modifies part of the steps (the step S110) and adds new steps (a step S111, a step S121, steps S130 to S138) in the first image retrieval program according to the first preferred embodiment. Therefore, in the description of the operation of the second image retrieval program, the modified step and the newly-added steps will be described.

Upon acquiring an image which a user has drawn with the drawing tool, the image retrieval device 100 executes a process of storing the sketch image in the step S110'. In this case, the image retrieval device 100 temporarily stores an image of a single line which the user has drawn most recently within the drawing area W3a together with a drawing order number of that drawn image. The drawing order number mentioned here means a number in an order of lines constituting an image being drawn within the drawing area W3a. For example, the drawing order number of an image drawn by a first line within a blank drawing area W3a is "1", and the drawing order number of an image drawn by a second line is "2". It should be noted that in this process of storing a sketch image in the step S110', the entire image drawn within the drawing area W3a is temporarily stored as one input image in a similar way to the first preferred embodiment.

Next, in the step S111, the image retrieval device 100 determines whether the acquired image of a latest single line is an image drawn by a second or subsequent line or not. When the image of a latest single line acquired by way of the drawing tool is an image drawn by a first line, the image retrieval device 100 determines that the answer is NO in this decision process and goes to the step S112, and then executes the processes of the step S114 and the steps 116. That is to say, when the image of a latest single line is an image drawn by a first line, a feature amount about the input image is calculated and a process of searching through the search target images is executed in a similar way to the first preferred embodiment. This is because the high frequency combination image is constituted by two component images. Therefore, when a high frequency combination image is constituted by three component images, an image which a user draws needs to be constituted by at least three lines.

On the other hand, when the image of a latest single line is an image drawn by a second or subsequent line, the image retrieval device 100 determines that the answer is YES in this decision process and goes to the step S130. In the step S130, the image retrieval device 100 generates a two-line combination image. The two-line combination image is a combination image of the acquired image of a latest single line and the acquired image of a single line drawn just before the latest single line. The number of images constituting this two-line combination image is the same as the number of component images constituting a high frequency combination image. That is to say, this two-line combination image corresponds to "a drawing order combination image" according to the present invention.

Next, in the step S132, the image retrieval device 100 calculates a feature amount about the generated two-line combination image. Since this two-line combination image feature amount, which is a feature amount about the two-line combination image, comprises a first feature amount and a second feature amount which are calculated by similar calculation processes to those of the first preferred embodiment, its description will be omitted.

Next, in the step S134, the image retrieval device 100 executes a process of searching through the search target images. This process of searching through the search target images in the step S134 is to measure image distance between a high frequency combination image and the two-line combination image, and extract a high frequency combination image having an image distance of not more than a predetermined value. In this case, this image distance between the high frequency combination image and the two-line combination image is calculated by using the two-line combination image feature amount and the previous image feature amount about the high frequency combination image. Since this calculation of image distance is similar to that of the first preferred embodiment, its description will be omitted. That is to say, this process of searching through the search target images in the step S134 is to compare an image of latest two lines input by way of the drawing tool with a high frequency combination image constituted by two component images which tend to have consecutive drawing numbers and thereby extract a search target image which a user wants quickly and accurately. It should be noted that as a result of the search process, a plurality of high frequency combination images linked to different search target images are sometimes extracted in response to one two-line combination image. In this case, the image retrieval device 100 arranges the plurality of high frequency combination images in an order of shorter image distance and extracts them.

Next, in the step S136, the image retrieval device 100 determines whether a high frequency combination image has been extracted by the process of searching through the search target images in the step S134 or not. In this case, when the high frequency combination image has been extracted by the process of searching through the search target images in the step S134, the image retrieval device 100 determines that the answer is YES in this decision process and goes to the step S138. In the step S138, the image retrieval device 100 has the display device 106 display a search result. In this case, the image retrieval device 100 has the display device 106 display search target images linked to the high frequency combination images in an order of shorter image distance between the high frequency combination images and the two-line combination image within the window W2. Then the image retrieval device 100 returns to the step S104.

On the other hand, when no high frequency combination image is extracted by the process of searching through the search target images in the step S134, the image retrieval device 100 determines that the answer is NO in this decision process and goes to the step S112 and then executes the processes of the step S114 and the step S116. That is to say, when no high frequency combination image is extracted, feature amounts are calculated and the process of searching through the search target images is executed in a similar way to the first preferred embodiment.

Next, the process of extracting a high frequency combination image in the step S121 will be described. This process of extracting a high frequency combination image in the step S121 is executed after the processes of the steps S106, S118 and S120, upon a user's selection of a certain search target image among search results displayed on the display unit 106. This process of extracting a high frequency combination image is to extract a combination image having a higher frequency of linkage to the same search target image than other combination images from combination images linked to the same search target image and constituted by two component images having consecutive drawing order numbers.

In this second preferred embodiment, combination images linked to the same search target image are selected for each series of previous sketch images, and then from those selected combination images, combination images constituted by two component images having consecutive drawing order numbers are extracted. Thus, combination images constituted by two component images having consecutive drawing order numbers are extracted for each series of previous sketch images. In this case, the extracted combination images are respectively linked to the same search target image. Then in all the combination images linked to the same search target image and having consecutive drawing order numbers, the number of combination images having the same image construction, in other words, the number of overlapping combination images among all the plural series of previous sketch images is counted. Thus a combination image having a high frequency of linkage to the same search target image can be specified.

Figure 12:
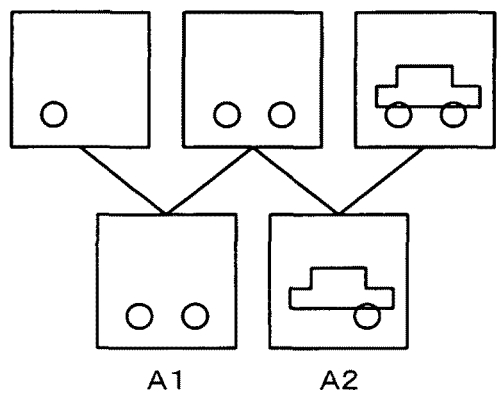
FIGS. 12(A) to 12(C) are explanatory views for explaining a process of extracting a high frequency combination image.
Figure 12:
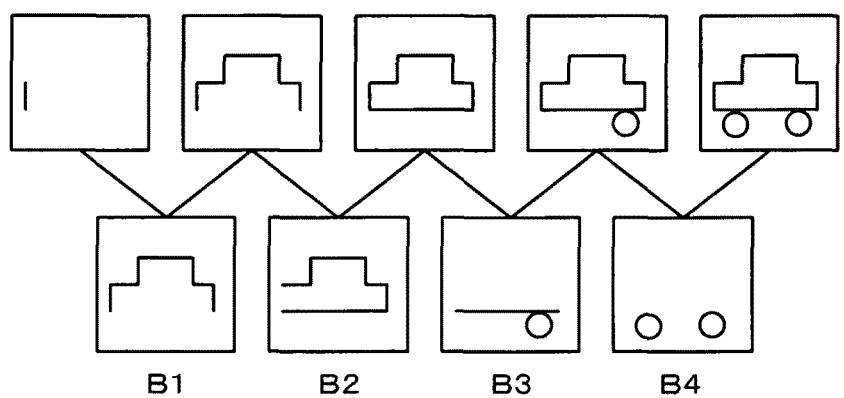
Figure 12:
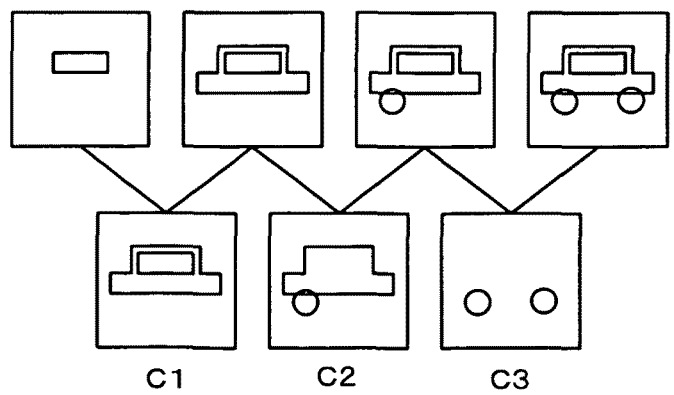
Figure 15:
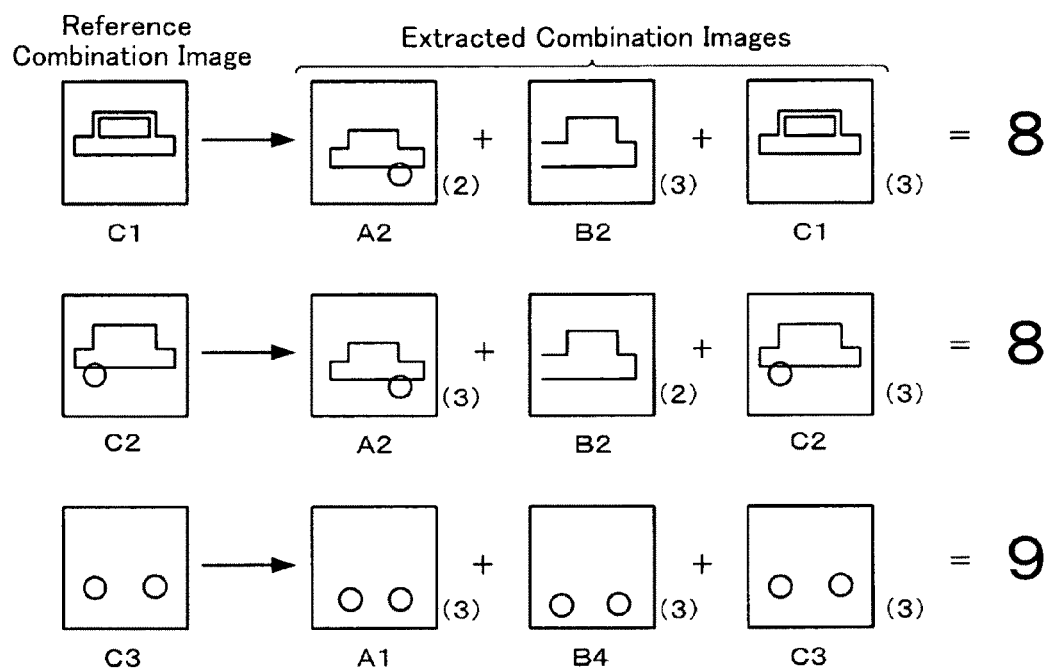
FIG. 15 is an explanatory view for explaining the process of extracting a high frequency combination image.

With reference to FIGS. 12(A) to 12(C), let's take an example of a process of extracting a high frequency combination image in response to input images (A) to (C) drawn in three kinds of drawing orders for retrieving a search target image of a car. First, combination images A1, A2, B1 to B4, and C1 to C3 constituted by two component images having consecutive drawing order numbers are generated for respective input images (A) to (C). Next, as shown in FIGS. 13 to 15, for each of the combination images A1, A2, B1 to B4, and C1 to C3, only one combination image having a most similar image construction in each of the input images (A) to (C) is extracted from the combination images A1, A2, B1 to B4, and C1 to C3 respectively constituting the input images (A) to (C).

For example, the combination images A1, B4, C3 are extracted as combination images similar to the combination image A1 constituting the input image (A). In this case, a process of comparing the respective combination images is carried out by using feature amounts about the respective combination images. Here, a combination image which serves as a reference for extraction is called a reference combination image, and combination images which are extracted for a reference combination image are called extracted combination images. Next, extracted combination images which are extracted for a reference combination image are compared with extracted combination images which are extracted when each of the former extracted combination images is used as a reference combination image, and the number of extracted combination images having the same image construction between the former and latter extracted combination images is counted (numbers in parentheses in the figures).

This counting process is executed for all the former extracted combination images and a sum of the counted numbers is calculated for each reference combination image (numbers at the right end in the figures). Thus, the number of overlapping combination images is counted for each of the input images (A) to (C). That is to say, a combination image having a largest sum is the most overlapping combination image among all the series of previous sketch images and a combination image having a high frequency of linkage to the same search target image. In this example, the combination image A1, B4, and C3 is a combination image having a higher frequency of linkage to the same search target image than other combination images.

As understood from the above description of the operation, according to the second preferred embodiment, a combination image having a high frequency of linkage to a search target image among combination images constituted by component images which constitute an input image and have consecutive drawing order numbers is stored as a high frequency combination image beforehand. When an image drawn by a user is compared with combination images, the image retrieval device 100 executes a process of comparing an input image constituted by component images each having a drawing order number in a range of the number of component images constituting the high frequency combination image back from a drawing order number of an image of a latest line input to the image input unit 105 with a high frequency combination image in priority to a process of comparing an input image with other combination images. Therefore, by giving priority to a comparison of an input image with a combination image constituted by two or more component images which have an empirical tendency to have consecutive drawing order numbers, which serves as a high frequency combination image, the search process can be executed more efficiently and accurately, when compared with a comparison of an input image with all component images and all combination images without considering which images should be compared in priority with the input image.

Moreover, the present invention can be embodied in other forms than the second preferred embodiment, and a variety of modifications are possible without departing from the spirit of the present invention. It is a matter of course that respective modifications shown below are also applicable to the first preferred embodiment.

For example, in the second preferred embodiment, upon selection of a certain search target image among search results displayed on the display unit 106, the image retrieval device 100 is constructed to automatically extract a high frequency combination image linked to that search target image. However, the image retrieval device 100 can be constructed to allow a user to designate one or more among combination images linked to the same search target images as one or more high frequency combination images to be stored. That is to say, a high frequency combination image does not need to be extracted by a calculation process by the image retrieval device 100. It is a matter of course that the method of extracting a high frequency combination image is not limited to the method of the second preferred embodiment.

In the second preferred embodiment, the image retrieval device 100 is constructed to store combination images in a mariner to distinguish a high frequency combination image from other combination images by attaching a flag. However, it is a matter of course that the method of distinguishing a high frequency combination image from other combination images is not limited to that of the second preferred embodiment. For example, the image retrieval device 100 can be constructed to generate a data base comprising only combination images extracted as high frequency combination images from combination images linked to the same search target image. In this case, a similar effect to that of the second preferred embodiment can be expected.

In the second preferred embodiment, the image retrieval device 100 is constructed such that a high frequency combination image is extracted from combination images constituted by component images having two consecutive drawing order numbers. However, as long as a high frequency combination image is extracted from combination images constituted by two or more component images having consecutive drawing order numbers, the present invention can be embodied in other forms than the second preferred embodiment. That is to say, a high frequency combination image can be extracted from combination images constituted by component images having three or four consecutive drawing order numbers. In this case, too, a similar effect to that of the second preferred embodiment can be expected.

In the second preferred embodiment, the image retrieval device 100 is constructed such that only one high frequency combination image (A1, B4, C3) is extracted from combination images linked to the same search target image. However, the number of high frequency combination images extracted does not need to be only one and the image retrieval device 100 can be constructed to extract two or more high frequency combination images. In this case, it is preferable to give the extracted plurality of high frequency combination images priority in accordance with frequency and execute a process of comparing a two-line combination image with the high frequency combination images in a higher order of priority. In this case, too, a similar effect to that of the second preferred embodiment can be expected.

In the second preferred embodiment, the image retrieval device 100 is constructed to calculate feature amounts such as an input image feature amount, previous image feature amounts, search target image feature amounts and two-line combination image feature amounts based on shape of each image. However, as long as each of the feature amounts is calculated based on an attribute of each image (for example, brightness information, color information, image frequency, histogram, or shape), as a matter of course, the present invention can be embodied in other forms than the second preferred embodiment. In this case, too, a similar effect to that of the second preferred embodiment can be expected.

Besides, in the second preferred embodiment, the image retrieval device 100 is constructed to have a user hand-draw an input image by operating the mouse 105b, just like drawing an image with a pencil and paper. However, instead of or in addition to this handwriting type drawing mode, it is possible to store parts images to be used for drawing images in the auxiliary storage unit 103 beforehand and appropriately use some of the stored parts images in drawing an input image. Examples of such parts images include images which are difficult to be drawn by such an input unit as a mouse or a pen tablet, and images which are used very frequently. Since drawing a person's detailed face is particularly difficult, an input image of a person's face can be prepared by storing such constituent elements of a face as eyes, mouths, noses, eyebrows, hairstyles as parts images of face parts beforehand, and selecting some of these face parts just like "playing a make-a-face game" or creating "a photo montage". In this case, the drawing order numbers in hand-drawing an input image corresponds to order numbers of selecting parts images and inputting them into an input unit. This input method improves not only efficiency in drawing input images but also accuracy in retrieving a desired search target image.

The invention claimed is:

1. An image retrieval device, comprising:
image input means for inputting an image;
search target image storing means for respectively storing a plurality of search target images to be searched;
search target image extracting means for comparing an input image feature amount that is based on an attribute of an input image that is input by the image input means with search target image feature amounts, each of the search target feature amounts being based on an attribute of each of the search target images, and extracting an extracted search target image that is similar to the input image from the search target images stored in the search target image storing means; and
search result output means for outputting the extracted search target image as a search result,
each of the search target image feature amounts comprises:
a first feature amount calculated about each of a plurality of pixels extracted from pixels constituting each of the images in accordance with a predetermined condition by counting the number of other pixels existing radially from a focused pixel in each of predetermined directions and statistically processing a distribution state of the number of pixels counted in each of the predetermined directions; and
a second feature amount calculated about each of the plurality of extracted pixels by statistically processing presence and absence patterns of two or less pixels adjacent to the focused pixel with respect to the focused pixel into 3 to 5 kinds of feature amount groups of the presence and absence patterns.

2. The image retrieval device according to claim 1, wherein the feature amount groups in the second feature amount are constituted such that the at least two pixels include any positional relation of a horizontal relation, a vertical relation, and two diagonal relations perpendicular to each other.

3. The image retrieval device according to claim 1, wherein each of the plurality of pixels extracted in accordance with the predetermined condition in the first feature amount and the second feature amount are pixels constituting a contour of the input image or the search target images.

4. The image retrieval device according to any of claim 1, wherein:
 the image input means is for inputting an image which a user draws,
 the image retrieval device further comprises:
  component image storing means for storing component images constituting a final input image input finally to the image input means in order to retrieve one of the search target images in a manner to be linked to the retrieved search target image;
  combination image generating means for generating at least one combination image by combining the component images stored in the at least one component image storing means with each other for every final input image;
  previous image feature amount calculating means for respectively calculating previous image feature amounts which are the feature amounts about the component images and the combination image;
  input image feature amount calculating means for calculating the input image feature amount about the input image including all input component images every time a component image is input to the image input means; and
  similar previous image extracting means for comparing the previous image feature amounts and the input image feature amount and extracting an image similar to the input image as a similar previous image from the component images and the at least one combination image, and
 the search result output means outputs the search target image linked to the similar previous image as a search result, in addition to the extracted search target image.

5. The image retrieval device according to claim 4, further comprising:
 search target image designating means for allowing the user to designate one of the search target images among the search results,
 when the one of the search target images is designated by the search target image designating means, the component image storing means stores component images constituting the final input image in a manner to be linked to the designated search target image.

6. The image retrieval device according to claim 4, wherein the similar previous image extracting means compares the input image feature amount and the previous image feature amounts about the component images in the same number as the number of component images constituting the input image that is input to the image input means in order to retrieve the same search target image or the at least one combination image constituted by these component images and extracts the similar previous image.

7. The image retrieval device according to claim 4, wherein:
 the component image storing means stores an order number of each of the component images being input to the image input means as a drawing order number together with each of the component images;
 the image retrieval device further comprises:
  high frequency combination image storing means for storing, as a high frequency combination image, a combination image having a higher frequency of linkage to the same search target image than other combination images among the combination images linked to the same search target image and constituted by two or more of the component images having consecutive drawing order numbers; and
  drawing order combination image generating means for generating a drawing order combination image constituted by component images each having a drawing order number in a range of the number of component images constituting the high frequency combination image back from a drawing order number of an image of a latest line input to the image input means every time a component image is input to the image input means;
 the input image feature amount calculating means calculates a drawing order combination image feature amount which is the feature amount about the drawing order combination image;
 the similar previous image extracting means extracts the similar previous image by executing a process of comparing the previous image feature amount about the high frequency combination image and the drawing order combination image feature amount in priority to a process of comparing other previous image feature amounts and the input image feature amount;
 when the high frequency combination image is extracted as the similar previous image by the previous image extracting means, the search result output means outputs the search target image linked to the extracted high frequency combination image.

8. The image retrieval device according to claim 7, further comprising high frequency combination image extracting means for extracting, as the high frequency combination image, the combination image having a higher frequency of linkage to the same search target image than other combination images among the combination images linked to the same search target image and constituted by two or more of the component images having consecutive drawing order numbers.

9. The image retrieval device according to claim 8, wherein:
 the high frequency combination image extracting means extracts a plurality of high frequency combination images for the same search target image and calculates priority in accordance with frequency of the extracted high frequency combination images; and
 the similar previous image extracting means extracts the similar previous images in a higher order of the priority by using the previous image feature amounts about the high frequency combination images.

10. The image retrieval device according to claim 4, wherein:
 the search target image storing means stores the search target image feature amounts; and
 when the similar previous image is not extracted by the similar previous image extracting means, the search target image extracting means compares the search target image feature amounts and the input image feature amount and extracts a search target image similar to the input image from the search target images.

11. The image retrieval device according to claim 4, wherein each of the component images is image information input in the form of one drawn line to the image input means.

12. The image retrieval device according to claim 4, further comprising:
parts image storing means for storing parts images to be used for drawing an image to be input to the image input means, the component images being the parts images input by way of the image input means.

13. A non-transitory computer readable medium storing a computer program for image retrieval for causing a computer device which controls operation of an image retrieval device, comprising image input means for inputting an image and search target image storing means for respectively storing a plurality of search target images to be searched, to execute:
a search target image extracting step of comparing an input image feature amount that is based on an attribute of an input image that is input by the image input means with search target image feature amounts, each of the search target feature amounts being based on an attribute of each of the search target images, and extracting an extracted search target image that is similar to the input image from the search target images stored in the search target image storing means; and
a search result output step of outputting the extracted search target image as a search result,
thereby retrieving the extracted search target image from the search target image storing means based on the image input to the image input means,
each of the search target image feature amounts comprises:
a first feature amount calculated about each of a plurality of pixels extracted from pixels constituting each of the search target images in accordance with a predetermined condition by counting the number of other pixels existing radially from a focused pixel in each of predetermined directions and statistically processing a distribution state of the number of pixels counted in each of the predetermined directions, and
a second feature amount calculated about each of the plurality of extracted pixels by statistically processing presence and absence patterns of two or less pixels adjacent to the focused pixel with respect to the focused pixel into 3 to 5 kinds of feature amount groups of the presence and absence patterns.

14. The non-transitory computer readable medium storing a computer program for image retrieval according to claim 13, further comprising:
a component image storing step for storing component images constituting a final input image drawn by a user and input finally to the image input means in order to retrieve one of the search target images in a manner to be linked to the retrieved search target image;
a combination image generating step of generating at least one combination image by combining the component images stored in the component image storing step with each other for every final input image;
a previous image feature amount calculating step of respectively calculating previous image feature amounts which are the feature amounts about the component images and the at least one combination image;
an input image feature amount calculating step of calculating the input image feature amount about the input image including all input component images every time a component image is input to the image input means; and
a similar previous image extracting step of comparing the previous image feature amounts and the input image feature amount and extracting an image similar to the input image as a similar previous image from the component images and the at least one combination image, and
the search result output step outputting the search target image linked to the similar previous image as a search result, in addition to the extracted search target image.

* * * * *